United States Patent
Kim et al.

(10) Patent No.: US 11,411,610 B2
(45) Date of Patent: Aug. 9, 2022

(54) NEAR FIELD COMMUNICATION (NFC) DEVICE AND METHOD OF DETECTING RESONANCE FREQUENCY OF THE SAME

(71) Applicant: Samsung Electronics Co., Ltd., Suwon-si (KR)

(72) Inventors: Youngseok Kim, Gwangju-si (KR); Sanghyo Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 71 days.

(21) Appl. No.: 16/991,666

(22) Filed: Aug. 12, 2020

(65) Prior Publication Data

US 2021/0203382 A1    Jul. 1, 2021

(30) Foreign Application Priority Data

Dec. 26, 2019    (KR) .................... 10-2019-0174890

(51) Int. Cl.
*H04B 5/00* (2006.01)

(52) U.S. Cl.
CPC ......... *H04B 5/0031* (2013.01); *H04B 5/0056* (2013.01); *H04B 5/0081* (2013.01)

(58) Field of Classification Search
CPC .. H04B 5/0031; H04B 5/0056; H04B 5/0081; H04B 5/0025; H04B 17/101; H04B 17/16; H04B 17/18; G01R 23/10; H04W 4/80
USPC ....................................................... 455/41.1
See application file for complete search history.

(56) References Cited

U.S. PATENT DOCUMENTS

| | | | |
|---|---|---|---|
| 6,236,276 B1 | 5/2001 | Cewers | |
| 6,496,556 B1 * | 12/2002 | Huehne | H03L 7/099 377/2 |
| 7,512,391 B2 | 3/2009 | Lester et al. | |
| 7,561,865 B2 | 7/2009 | Zhang et al. | |
| 9,653,948 B2 | 5/2017 | Polu et al. | |
| 9,685,996 B1 | 6/2017 | Thoen | |
| 9,933,466 B2 | 4/2018 | Whatmough et al. | |
| 10,284,243 B2 | 5/2019 | Kim et al. | |
| 2006/0160136 A1 * | 7/2006 | Xiang | G01R 33/34053 435/7.1 |
| 2018/0003749 A1 * | 1/2018 | Dogiamis | G01D 18/006 |
| 2019/0074776 A1 | 3/2019 | Tian | |
| 2019/0113646 A1 * | 4/2019 | Su | G01V 3/101 |

* cited by examiner

*Primary Examiner* — Eugene Yun
(74) *Attorney, Agent, or Firm* — Harness, Dickey & Pierce, P.L.C.

(57) ABSTRACT

A near field communication (NFC) device includes a resonator including an antenna and a matching circuit, a transmitter and a frequency detector. The transmitter generates a sensing voltage signal at the resonator. With respect to a plurality of measurement periods where each measurement period includes a turn-on period and a turn-off period, the transmitter is enabled to output a radio frequency (RF) signal to the resonator during the turn-on period and disabled during the turn-off period. The frequency detector detects a resonance frequency of the resonator based on the sensing voltage signal. The resonance frequency is accurately detected by measuring the resonance frequency during the plurality of measurement periods. In addition, the resonance frequency is efficiently detected by generating the sensing voltage signal using the transmitter established in the NFC device.

20 Claims, 17 Drawing Sheets

FIG. 12

MTAB

| fr | 12.6 | 12.7 | 12.8 | 12.9 | 13 | 13.1 | 13.2 | 13.3 | 13.4 | 13.5 | 13.6 | 13.7 | 13.8 | 13.9 | 14 |
|---|---|---|---|---|---|---|---|---|---|---|---|---|---|---|---|
| X1 | 5031 | 5035 | 5037 | 5050 | 5056 | 5059 | 5062 | 5067 | 5079 | 5083 | 5086 | 5088 | 5093 | 5102 | 5105 |
| Y2 | 5018 | 5029 | 5035 | 5042 | 5047 | 5048 | 5056 | 5062 | 5064 | 5070 | 5076 | 5079 | 5091 | 5096 | 5098 |
| Z3 | 5023 | 5027 | 5038 | 5042 | 5046 | 5050 | 5050 | 5052 | 5054 | 5059 | 5072 | 5078 | 5082 | 5093 | 5097 |

| fr | 14.1 | 14.2 | 14.3 | 14.4 | 14.5 | 14.6 | 14.7 | 14.8 | 14.9 | 15 |
|---|---|---|---|---|---|---|---|---|---|---|
| X1 | 5112 | 5121 | 5121 | 5123 | 5134 | 5153 | 5165 | 5172 | 5174 | 5188 |
| Y2 | 5106 | 5111 | 5121 | 5127 | 5129 | 5135 | 5138 | 5143 | 5153 | 5161 |
| Z3 | 5101 | 5108 | 5115 | 5122 | 5128 | 5137 | 5152 | 5159 | 5163 | 5170 |

NEAR FIELD COMMUNICATION (NFC) DEVICE AND METHOD OF DETECTING RESONANCE FREQUENCY OF THE SAME

CROSS-REFERENCE TO RELATED APPLICATION

This U.S. non-provisional application claims priority under 35 USC § 119 to Korean Patent Application No. 10-2019-0174890, filed on Dec. 26, 2019, in the Korean Intellectual Property Office (KIPO), the disclosure of which is incorporated by reference herein in its entirety.

BACKGROUND

Some example embodiments relate generally to semiconductor integrated circuits, and more particularly to a near field communication (NFC) device and/or a method of detecting a resonance frequency of the NFC device.

Near field communication (NFC) technology is/includes a short-range wireless communication technology. As NFC technology has been developed, NFC devices have been more commonly employed in mobile devices. A resonance frequency of a resonator included in the NFC device is determined by combination of RF elements in the resonator, and the resonance frequency may be varied due to deviations in characteristics of the RF elements. A signal quality of the NFC device is enhanced as the resonance frequency approaches a center value of an optimal frequency band, and the signals of the signals of the NFC device are distorted as the resonance frequency is far from the center value. Securing the uniform performance of the NFC device by detecting resonance characteristics of the NFC device to compensate the distorted signals may be required or desired. Conventionally the resonance frequency is detected by an external device using a phase delay cell, and thus detecting resolution is degraded.

SUMMARY

Some example embodiments may provide a near field communication (NFC) device and/or a method capable of efficiently detecting a resonance frequency of a resonator included in the NFC device.

According to some example embodiments, a near field communication (NFC) device includes a resonator including an antenna and a matching circuit, a transmitter configured to generate a sensing voltage signal at the resonator during a plurality of measurement periods, each of the plurality of measurement periods including a turn-on period and a turn-off period, the transmitter being enabled to output a radio frequency (RF) signal to the resonator during the turn-on period and being disabled from outputting an RF signal to the resonator during the turn-off period, and a frequency detector configured to detect a resonance frequency of the resonator based on the sensing voltage signal.

According to some example embodiments, a method of detecting a resonance frequency of a near field communication (NFC) device includes during a plurality of measurement periods where each of the plurality of measurement periods includes a turn-on period and a turn-off period, generating a sensing voltage signal at a resonator included in an NFC device by enabling a transmitter included in the NFC device to output a radio frequency (RF) signal to the resonator during the turn-on period and by disabling the transmitter during the turn-off period, and detecting a resonance frequency of the resonator based on the sensing voltage signal.

According to some example embodiments, a method of detecting a resonance frequency of a near field communication (NFC) device includes during a plurality of measurement periods where each measurement period includes a turn-on period and a turn-off period, generating an RF enable signal that is activated during the turn-on period and deactivated during the turn-off period, generating a sensing voltage signal based on the RF enable signal, the sensing voltage generated at a resonator included in an NFC device by enabling a transmitter included in the NFC device to output a radio frequency (RF) signal to the resonator during the turn-on period and by disabling the transmitter during the turn-off period, generating a clock signal that toggles according to oscillation of the sensing voltage signal, generating a clock count by counting a clock number of the clock signal during an activation time interval of a count enable signal, and providing the resonance frequency based on the clock count.

The NFC device and/or the method according to some example embodiments may more accurately detect the resonance frequency by measuring the resonance frequency during the plurality of measurement periods. The resonance frequency may be detected more accurately by converting the sensing voltage signal to the clock signal and counting the clock number of the clock signal.

The NFC device and/or the method according to some example embodiments may efficiently or more efficiently detect the resonance frequency by generating the sensing voltage signal using the transmitter established in the NFC device.

The NFC device and/or the method according to some example embodiments may efficiently or more efficiently detect the resonance frequency without an external apparatus by implementing the frequency detector as an on-chip component.

BRIEF DESCRIPTION OF THE DRAWINGS

Some example embodiments of inventive concepts will be more clearly understood from the following detailed description taken in conjunction with the accompanying drawings.

FIGS. 12 and 13 are diagrams illustrating example embodiments of a mapping table for detection of a resonance frequency of an NFC device according to some example embodiments.

DETAILED DESCRIPTION OF EXAMPLE EMBODIMENTS

Figure 1:
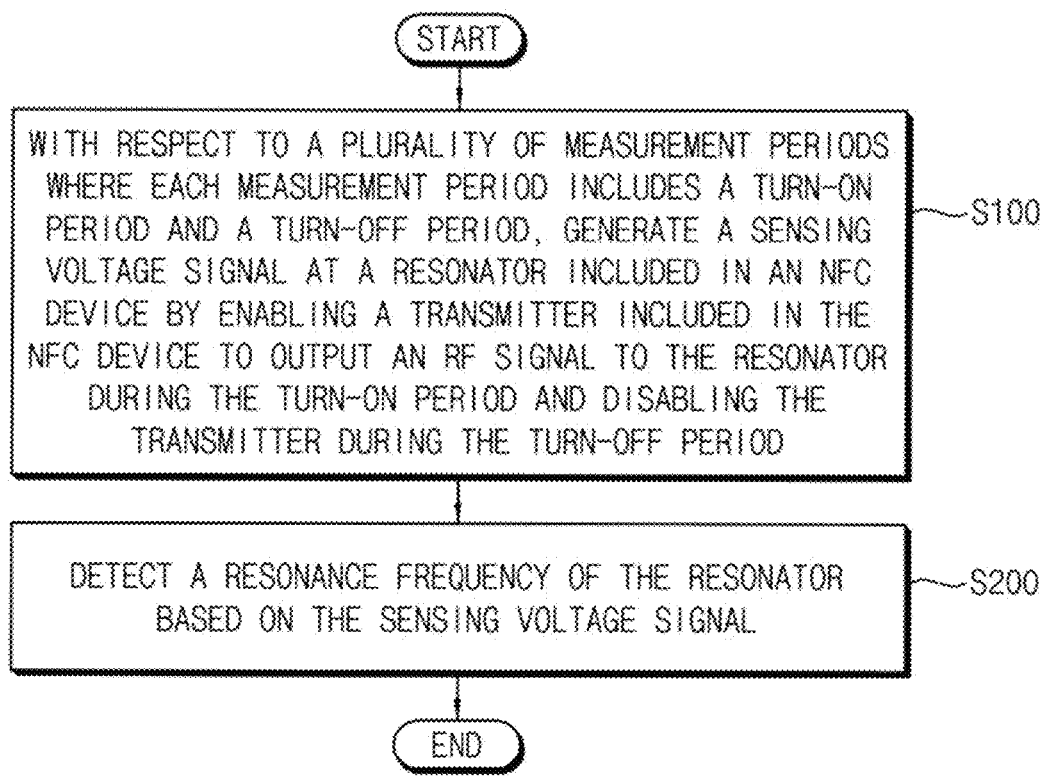
FIG. 1 is a flow chart illustrating a method of detecting a resonance frequency of a near field communication (NFC) device according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of detecting a resonance frequency of a near field communication (NFC) device according to some example embodiments.

Referring to FIG. 1, with respect to a plurality of measurement periods where each measurement period includes a turn-on period and a turn-off period, a sensing voltage signal is generated at a resonator included in an NFC device by enabling a transmitter included in the NFC device to output a radio frequency (RF) signal to the resonator during the turn-on period, and by disabling the transmitter during the turn-off period (S100).

The sensing voltage signal may oscillate with a transmission frequency during the turn-on period, with the transmission frequency based on the RF signal. In addition, the sensing voltage signal may oscillate with the resonance frequency during the turn-off period, with the resonance frequency based on an induced electromotive force caused in (induced in) the resonator by the RF signal. The generation of the sensing voltage signal will be further described below with reference to FIGS. 2 and 3.

A resonance frequency of the resonator is detected based on the sensing voltage signal (S200).

The NFC device and/or the method according to some example embodiments may more accurately detect the resonance frequency by measuring the resonance frequency during the plurality of measurement periods. The resonance frequency may be detected more accurately by converting the sensing voltage signal to a clock signal and counting a clock number (e.g. a number of cycles) of the clock signal.

In some example embodiments, the resonance frequency may be detected by converting the sensing voltage signal to the clock signal and counting the clock number of the clock signal. As such, accuracy and efficiency of the frequency detection may be enhanced.

In some example embodiments, the resonance frequency may be calculated based on a time interval of the turn-on period, a time interval of the turn-off period, a number of the plurality of measurement periods, and/or the measured clock count.

In some example embodiments, the resonance frequency may be determined based on a mapping table indicating mapping relation between a plurality of values of the clock count and a plurality of values of the resonance frequency.

Figure 2:
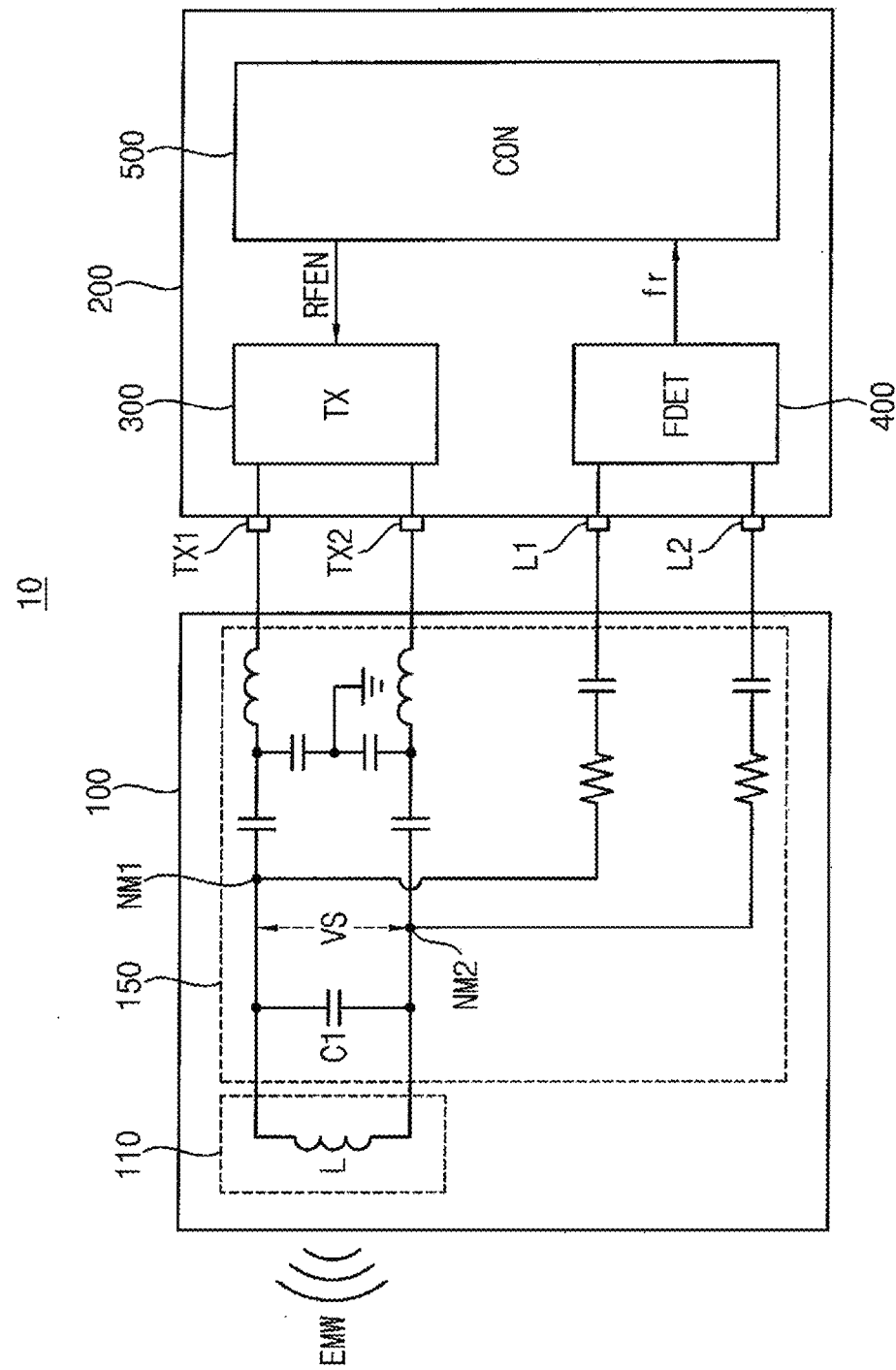
FIG. 2 is a diagram illustrating an NFC device according to some example embodiments.

FIG. 2 is a diagram illustrating an NFC device according to some example embodiments.

Referring to FIG. 2, an NFC device 10 includes a resonator 100 and an NFC chip 200. The NFC chip 200 includes a transmitter TX 300, a frequency detector FDET 400, and a controller CON 500. FIG. 2 illustrates only some components, for example for detecting the resonance frequency, and other components such as a receiver are omitted. An example of a detailed configuration will be described with reference to FIG. 14. The transmitter TX 300, the frequency detector FET 400, and the controller 500 may be implemented in hardware and/or software. Furthermore some of the functions of the components of the NFC chip 200 may be performed by other components of the NFC chip 200; example embodiments are not limited thereto.

The resonator 100 may include a resonance circuit 110 including an inductance component (an inductor) L and a matching circuit 150 having a capacitor C1. FIG. 2 illustrates a non-limiting example of the resonator 100 and configurations of the resonator 100 may be implemented in various manners.

The transmitter 300 may be coupled to the resonator 100 through first and second transmission terminals TX1 and TX2.

In a normal mode for communicating with external devices, the transmitter 300 may output an RF signal to the resonator 100 by modulating a signal from the controller 500, and a receiver (not shown) may demodulate an RF signal received through the resonator 100 to provide the demodulated signal to the controller 500.

In a measurement mode for detecting the resonance frequency, the transmitter 300 may generate a sensing voltage signal VS at the resonator 100. With respect to a plurality of measurement periods where each measurement period includes a turn-on period and a turn-off period, the transmitter 300 may be enabled to output an RF signal to the resonator 100 during the turn-on period, and may be disabled during the turn-off period, generating the sensing voltage signal VS.

For example, the sensing voltage signal VS may correspond to a voltage across the capacitor C1. FIG. 2 illustrates a non-limiting example of a differential transmitting and receiving scheme and it would be understood that example embodiments may be applicable to a sing-ended transmitting/receiving scheme.

In some example embodiments, as will be described below with reference to FIG. 3, the transmitter 300 may generate the sensing voltage signal VS based on an RF enable signal RFEN that is activated during the turn-on period and is deactivated during the turn-off period. For example, the RF enable signal RFEN may be provided from the controller 500, but example embodiments are not limited thereto, and the RF enable signal RFEN may be provided from another system and/or outside of the components illustrated in FIG. 3.

The frequency detector 400 may be coupled to the resonator 100 through first and second power terminals L1 and L2. The frequency detector 400 may detect the resonance frequency fr of the resonator 100 based on the sensing voltage signal VS.

In some example embodiments, the resonance frequency fr may be used as information for controlling the operation of the NFC device 10. For example, as will be described below with reference to FIGS. 15 and 16, a detection result of the resonance frequency fr may be used to control a full-down amount of the transmitter 300. Alternatively or additionally, as will be described below with reference to FIG. 18, the detection result of the resonance frequency fr may be used to adjust the resonance frequency fr.

In some example embodiments, the resonance frequency fr may be provided to an external device to determine failure of the NFC device 10 and/or improve design of the NFC device 10.

The controller 500 may include a processor, a memory block, etc. for controlling overall operations of the NFC device 10. The controller 500 may provide signals for controlling the frequency detector 400 and receive the detected resonance frequency fr or information on the resonance frequency fr from the frequency detector 400 The NFC device 10 illustrated in FIG. 2 may communicate with an external device through an NFC scheme. In some example embodiments, the NFC device 10 may perform an operation of detecting whether an NFC card (not illustrated) is near the NFC device 10 (e.g., within a certain threshold proximity range of the NFC device 10), and/or an operation of detecting whether an NFC reader (not illustrated) is near the NFC device 10. These operations between an NFC card/tag and an NFC device may be performed alternatively and repeatedly. If and/or when the NFC device 10 detects an NFC reader near the NFC device 10, the NFC device 10 may operate in a card mode, in which the NFC device 10 operates as a card. In the card mode, the NFC device 10 may communicate data (e.g., transmit and receive data) with the NFC reader using an electromagnetic wave EMW emitted by the NFC reader. Alternatively, if and/or when the NFC device 10 detects an NFC card near the NFC device 10 (e.g., within a threshold proximity range of the NFC device 10), the NFC device 10 may operate in a reader mode, in which the NFC device 10 operates as an NFC reader. In the reader mode, the NFC device 10 may emit an electromagnetic wave EMW to communicate data with the NFC card.

In the reader mode, the resonator 100 may emit the electromagnetic wave EMW to communicate data with the NFC card. In the reader mode, the NFC chip 200 may provide an output current and/or a driver current to the resonator 100 and the resonator 100 may emit the electromagnetic wave EMW corresponding to the driver current to communicate with the NFC card. Since the NFC card includes a resonance circuit that includes an antenna having an inductance component and a resonance capacitor, a mutual induction may occur between the resonator 100 and the NFC card, which may be located near the resonator 100, while the resonator 100 emits the electromagnetic wave EMW. Therefore, an antenna voltage may be generated at the resonance circuit of the resonator 100 through the mutual induction with the NFC card.

Figure 3:
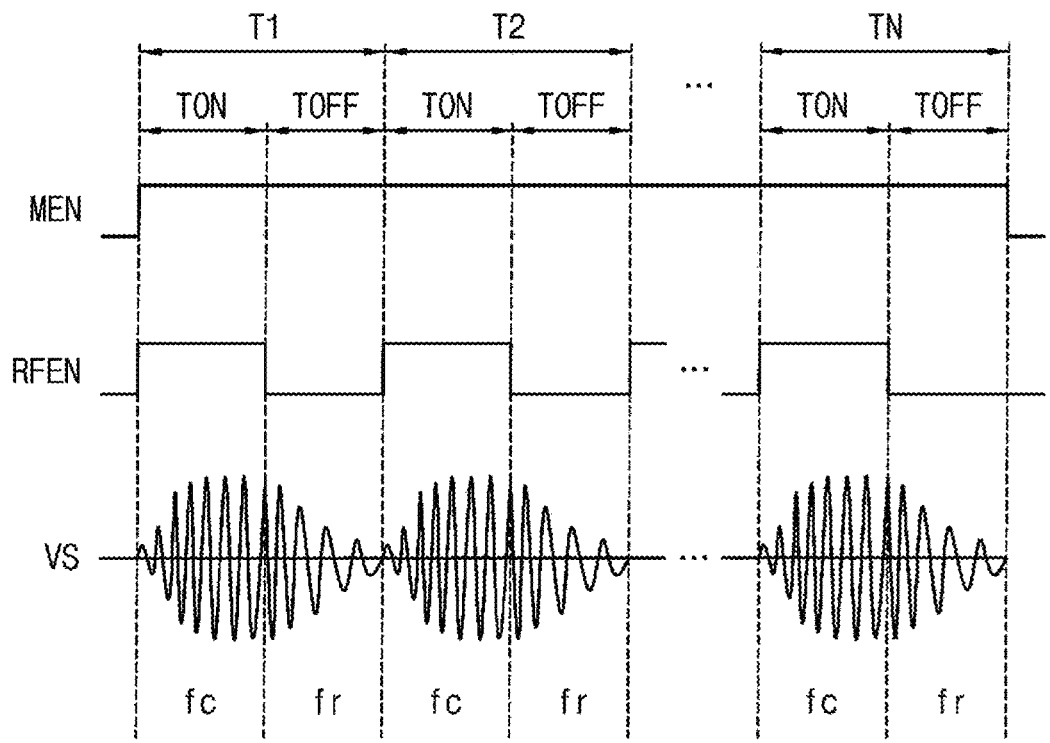
FIG. 3 is a timing diagram illustrating a sensing voltage signal to detect a resonance frequency of an NFC device according to some example embodiments.

FIG. 3 is a timing diagram illustrating a sensing voltage signal to detect a resonance frequency of an NFC device according to some example embodiments.

Referring to FIG. 3, a measurement enable signal MEN may be activated during a plurality of measurement periods T1~TN. For example, the measurement enable signal MEN may be activated in a logic high level. The measurement enable signal MEN may be generated and used in the controller 500 in FIG. 2, and may be provided to the frequency detector 400.

Each of the plurality of measurement periods T1~TN may include a turn-on period TON and a turn-off period TOFF. The RF enable signal RFEN may be activated during the turn-on period TON, and may be deactivated during the turn-off period TOFF. The RF enable signal RFEN may be generated by the controller 500 and then provided to the transmitter 300. The turn-on period TON may be longer than, shorter than, or the same amount of time as the turn-off period TOFF.

Based on the RF enable signal RFEN, the transmitter 300 may be enabled to output an RF signal to the resonator 100 during the turn-on period TON, and the transmitter 300 may be disabled during the turn-off period TOFF, thereby generating the sensing voltage signal VS at the resonator 100. Even though the RF signal is blocked during the turn-off period TOFF, the sensing voltage signal VS may maintain oscillation by the induced electromotive force caused in the resonator 100 at the end time point of the turn-on period TON.

As a result, the sensing voltage signal VS may oscillate with a transmission frequency fc during the turn-on period TON based on the RF signal, and may oscillate with the resonance frequency fr during the turn-off period TOFF based on the induced electromotive force caused in the resonator 100 by the RF signal.

As will be described below, the frequency detector 400 may detect, as the resonance frequency fr, the oscillation frequency of the sensing voltage signal VS during the turn-off period TOFF.

Figure 4:
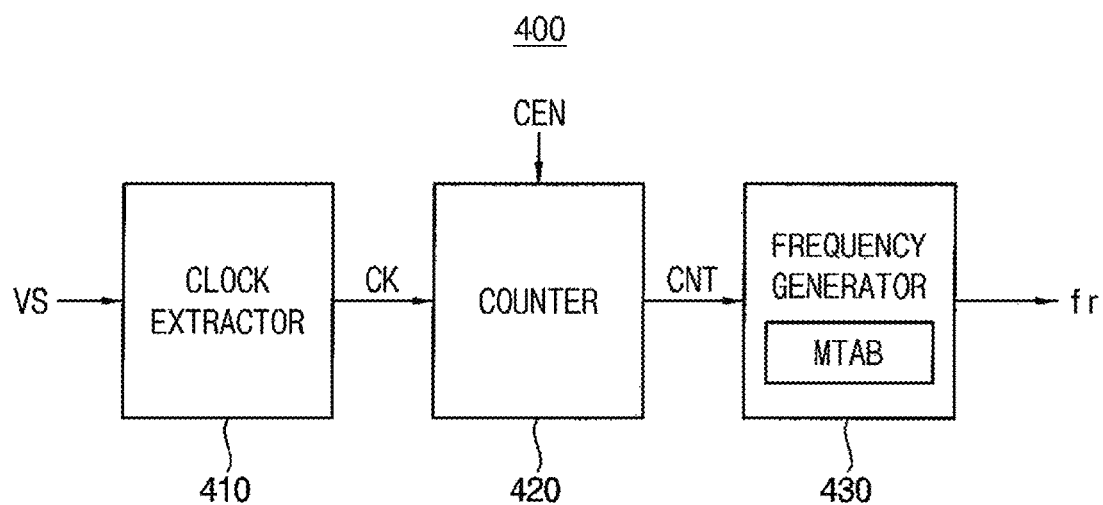
FIG. 4 is a block diagram illustrating a frequency detector according to some example embodiments.

FIG. 4 is a block diagram illustrating a frequency detector according to some example embodiments.

Referring to FIG. 4, a frequency detector 400 may include a clock extractor 410, a counter 420 and a frequency generator 430. The frequency detector 400, the clock extractor, the counter 420, and the frequency generator 430 may include processing circuitry such as hardware including logic circuits; a hardware/software combination such as a processor executing software; or a combination thereof.

The clock extractor 410 may generate a clock signal CK toggling according to oscillation of the sensing voltage signal VS. The schemes of generating clock signal CK based on an oscillating signal as the sensing voltage signal VS are well known to those of ordinary skill in the art and the configuration of the clock extractor 410 may be implemented variously.

The counter 420 may generate a clock count CNT by counting a clock number (e.g. a toggle) of the clock signal CK. In some example embodiments, the counter 420 may receive a count enable signal CEN and may generate the clock count CNT by counting the clock number during an activation time interval of the count enable signal CEN. The schemes of counting a clock number of a clock signal are well known to those of ordinary skill in the art and the configuration of the counter 420 may be implemented variously.

The frequency generator 430 may provide the resonance frequency fr based on the clock count CNT.

In some example embodiments, the frequency generator 430 may determine the resonance frequency fr by calculating the resonance frequency fr based on a time interval of the turn-on period TON, a time interval of the turn-off period TOFF, a number of the plurality of measurement periods T1~TN, and the measured clock count CNT. In this case, the frequency detector 430 may include simple operation logic for the calculation. The operation logic may be implemented as hardware, software or combination thereof.

In some example embodiments, the frequency generator 430 may determine the resonance frequency fr based on a mapping table MTAB indicating mapping relation between a plurality of values of the clock count CNT and a plurality of values of the resonance frequency fr. In this case, the frequency generator 430 may include a memory to store the mapping table MTAB and a circuit (not illustrated) to extract the value of the resonance frequency fr corresponding the measured clock count CNT from the memory.

Figure 5:
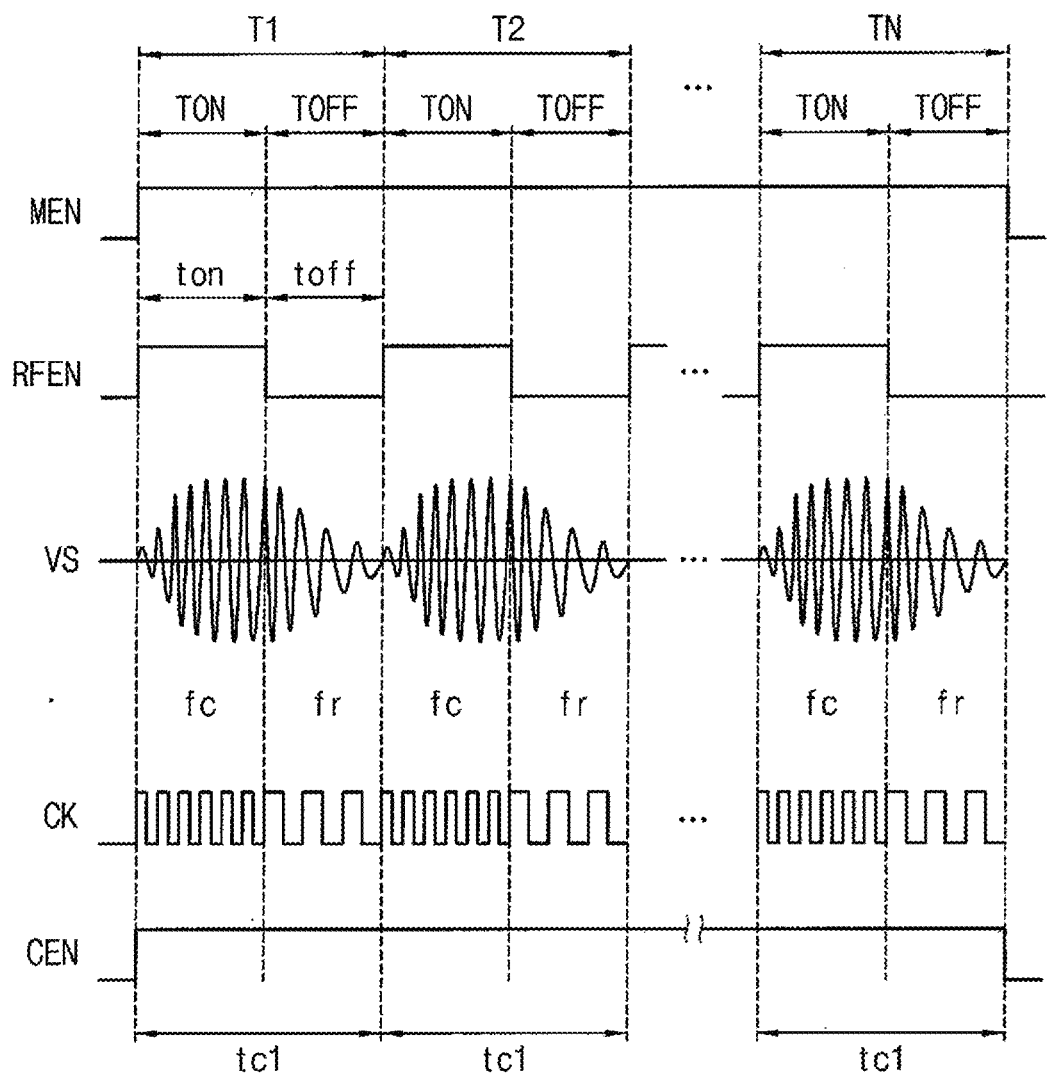
FIG. 5 is a timing diagram illustrating a method of detecting a resonance frequency of an NFC device according to some example embodiments.

FIG. 5 is a timing diagram illustrating a method of detecting a resonance frequency of an NFC device according to some example embodiments.

Referring to FIG. 5, a measurement enable signal MEN may be activated during a plurality of measurement periods T1~TN. For example, the measurement enable signal MEN may be activated in a logic high level. The measurement enable signal MEN may be generated and used in the controller 500 in FIG. 2, and may be provided to the frequency detector 400.

Each of the plurality of measurement periods T1~TN may include a turn-on period TON and a turn-off period TOFF. The RF enable signal RFEN may be activated during the turn-on period TON, and deactivated during the turn-off period TOFF. The RF enable signal RFEN may be generated by the controller 500 and then provided to the transmitter 300. The turn-on period TON may be longer than, shorter than, or the same amount of time as the turn-off period TOFF.

Based on the RF enable signal RFEN, the transmitter 300 may be enabled to output an RF signal to the resonator 100 during the turn-on period TON and disabled during the turn-off period TOFF, thereby generating the sensing voltage signal VS at the resonator 100. Even though the RF signal is blocked during the turn-off period TOFF, the sensing voltage signal VS may maintain oscillation by an induced electromotive force caused in the resonator 100 at the end time point of the turn-on period TON.

The clock extractor 410 in FIG. 4 may generate a clock signal CK toggling according to oscillation of the sensing voltage signal VS. As described above, the sensing voltage signal VS may oscillate with a transmission frequency fc during the turn-on period TON based on the RF signal, and may oscillate with the resonance frequency fr during the turn-off period TOFF based on the induced electromotive force caused in the resonator 100 by the RF signal. Accordingly, the clock signal CK may oscillate with a transmission frequency fc during the turn-on period TON and oscillate with the resonance frequency fr during the turn-off period TOFF.

The counter 420 in FIG. 4 may generate the clock count CNT by counting the clock number (e.g. the number of transmissions) during an activation time interval of the count enable signal CEN. In some example embodiments, the count enable signal CEN may be activated during the plurality of measurement periods T1~TN regardless of the turn-on period TON and the turn-off period TOFF. In other words, the count enable signal CEN may be substantially the same as the measurement enable signal MEN. In this case, the time interval of counting the clock number corresponds to N*tc1, where N indicate the number of the plurality of measurement periods T1~TN and tc1 indicates the cyclic time of each measurement period.

The resonance frequency fr may be determined by calculating the resonance frequency fr based on a time interval of the turn-on period TON, a time interval of the turn-off period TOFF, a number of the plurality of measurement periods T1~TN and the measured clock count CNT.

In case of FIG. 5, the clock count CNT and the resonance frequency fr may satisfy Equation 1.

$$CNT*(ton/toff)=(N*toff)/Tr=N*toff*fr \qquad \text{Equation 1}$$

In Equation 1, fr indicate the resonance frequency, CNT indicates the clock count, N indicates a number of the plurality of measurement periods, ton indicates a time interval of each turn-on period, toff indicates a time interval of each turn-off period, and Tr indicates a resonance cyclic period and corresponds to 1/fr.

As a result, the frequency generator 430 in FIG. 4 may determine the resonance frequency fr by Equation 2.

$$fr=(CNT*ton)/(N*toff^2) \qquad \text{Equation 2}$$

Figure 6:
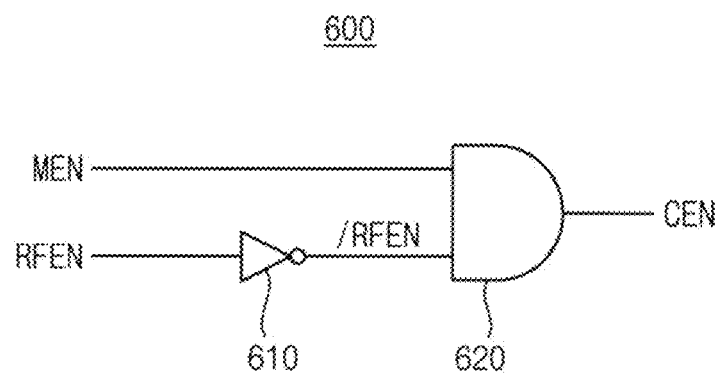
FIG. 6 is a circuit diagram illustrating an example embodiment of a count control circuit included in an NFC device according to some example embodiments.
Figure 7:
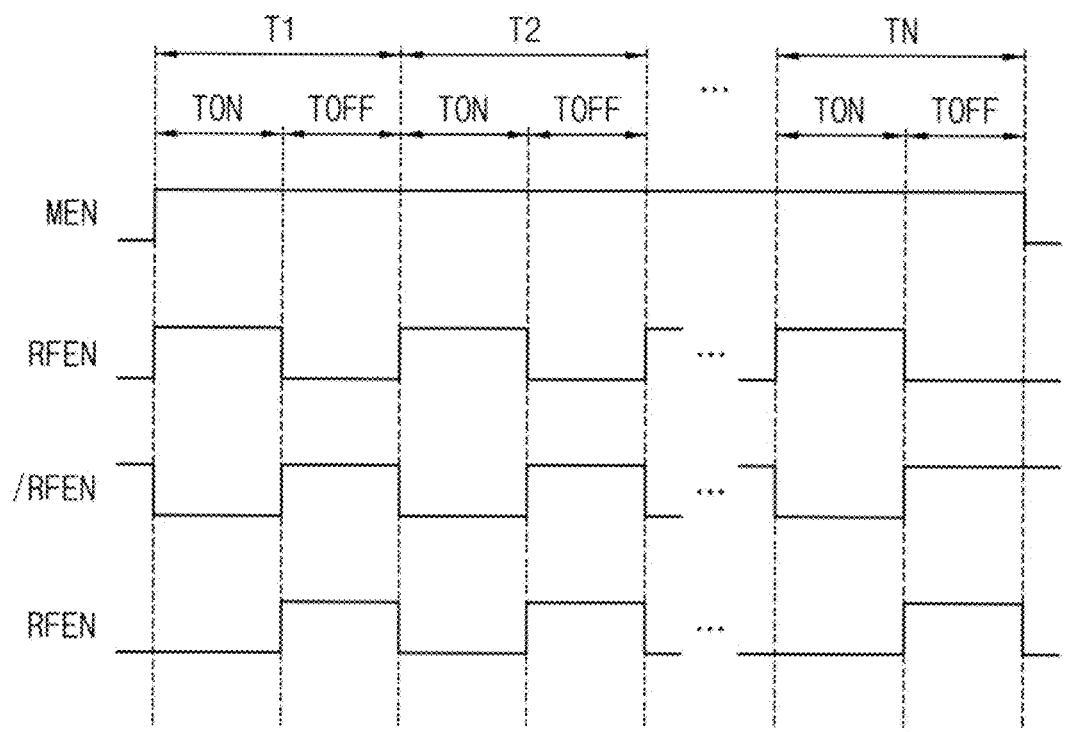
FIG. 7 is a timing diagram illustrating an operation of the count control circuit of FIG. 6.

FIG. 6 is a circuit diagram illustrating an example embodiment of a count control circuit included in an NFC device according to some example embodiments, and FIG. 7 is a timing diagram illustrating an operation of the count control circuit of FIG. 6.

Referring to FIGS. 6 and 7, a count control circuit 600 may include an inverter 610 and an AND logic gate 620. The count control circuit 600 may be included in the controller 500 or the frequency detector 400 in FIG. 2. FIG. 6 is a non-limiting example embodiment and the configuration of the count control circuit 600 may be implemented variously.

The inverter 610 may generate an inversion RF enable signal/RFEN by inverting the RF enable signal RFEN that is activated during the turn-on period TON and deactivated during the turn-off period TOFF.

The AND logic gate 620 may generate the count enable signal CEN by performing an AND logic operation on a measurement enable signal MEN and the inversion RF enable signal/RFEN, where the measurement enable signal MEN is activated during the plurality of measurement periods T1~TN.

As a result, the count enable signal CEN may be deactivated during the turn-on period TON, and activated during the turn-off period TOFF.

Figure 8:
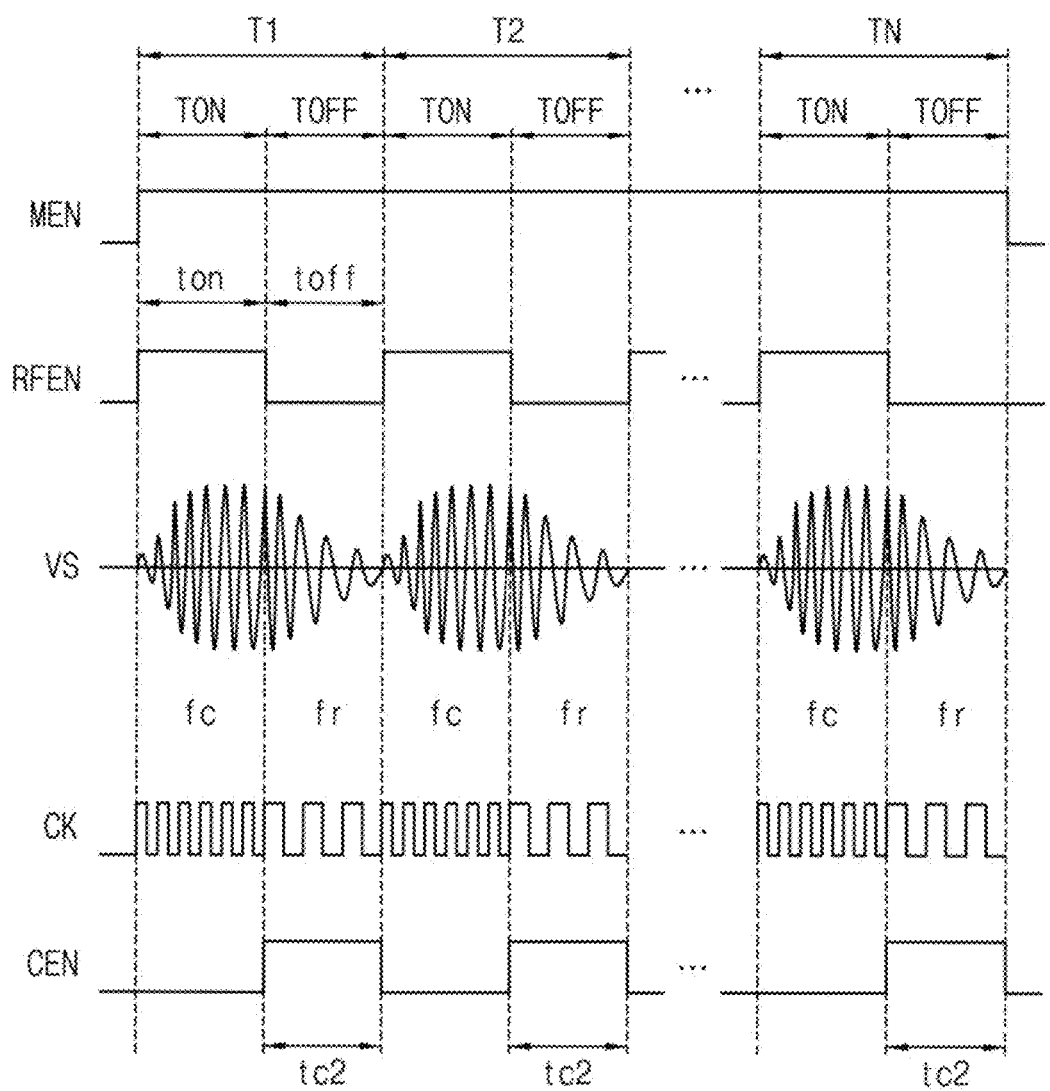
FIG. 8 is a timing diagram illustrating a method of detecting a resonance frequency of an NFC device according to some example embodiments.

With reference to FIG. 8, a method of detecting a resonance frequency of an NFC device using the count enable signal CEN of FIGS. 6 and 7 may be described.

FIG. 8 is a timing diagram illustrating a method of detecting a resonance frequency of an NFC device according to some example embodiments.

Referring to FIG. 8, a measurement enable signal MEN may be activated during a plurality of measurement periods T1~TN. For example, the measurement enable signal MEN may be activated in a logic high level.

Each of the plurality of measurement periods T1~TN may include a turn-on period TON and a turn-off period TOFF. The RF enable signal RFEN may be activated during the turn-on period TON and deactivated during the turn-off period TOFF. The turn-on period TON may be longer than, shorter than, or the same amount of time as the turn-off period TOFF.

Based on the RF enable signal RFEN, the transmitter 300 may be enabled to output an RF signal to the resonator 100 during the turn-on period TON, and disabled during the turn-off period TOFF, thereby generating the sensing voltage signal VS at the resonator 100.

The clock extractor 410 in FIG. 4 may generate a clock signal CK toggling according to an oscillation of the sensing voltage signal VS. The clock signal CK may oscillate with a transmission frequency fc during the turn-on period TON and oscillate with the resonance frequency fr during the turn-off period TOFF.

The counter 420 in FIG. 4 may generate the clock count CNT by counting the clock number (e.g. the number of transitions of the clock signal CK) during an activation time interval of the count enable signal CEN. In some example embodiments, the count enable signal CEN may be deactivated during the turn-off period TOFF and activated during the turn-off period TOFF. In this case, the time interval of counting the clock number corresponds to N*tc2, where N indicate the number of the plurality of measurement periods T1~TN and tc2 indicates the time interval of each turn-off period TOFF.

The resonance frequency fr may be determined by calculating the resonance frequency fr based on a time interval of the turn-off period TOFF, a number of the plurality of measurement periods T1~TN and the measured clock count CNT.

In case of FIG. 8, the clock count CNT and the resonance frequency fr satisfy Equation 3.

$$CNT=(N*toff)/Tr=N*toff*fr \qquad \text{Equation 3}$$

In Equation 3, fr indicate the resonance frequency, CNT indicates the clock count, N indicates a number of the plurality of measurement periods, toff indicates a time interval of each turn-off period, and Tr indicates a resonance cyclic period and corresponds to 1/fr.

As a result, the frequency generator 430 in FIG. 4 may determine the resonance frequency fr by Equation 4.

$$fr=CNT/(N*toff) \qquad \text{Equation 4}$$

Figure 9:
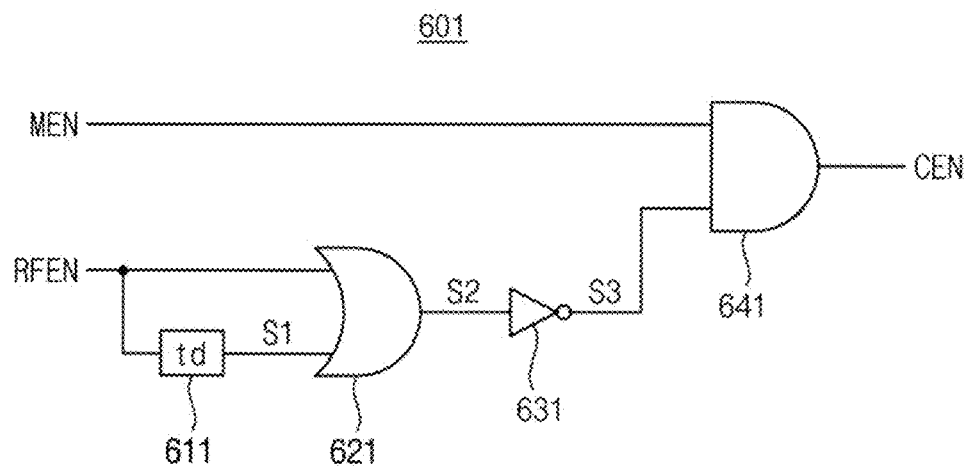
FIG. 9 is a circuit diagram illustrating an example embodiment of a count control circuit included in an NFC device according to some example embodiments.
Figure 10:
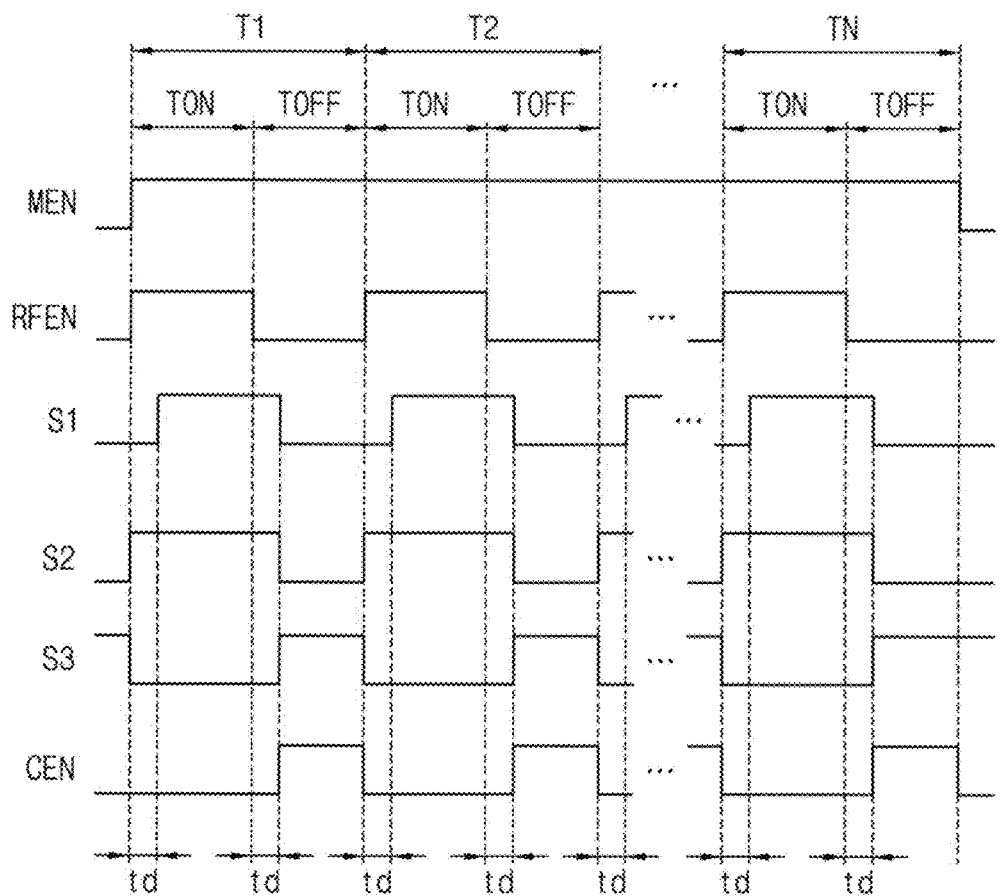
FIG. 10 is a timing diagram illustrating an operation of the count control circuit of FIG. 9.

FIG. 9 is a circuit diagram illustrating an example embodiment of a count control circuit included in an NFC device according to some example embodiments, and FIG. 10 is a timing diagram illustrating an operation of the count control circuit of FIG. 9.

Referring to FIGS. 9 and 10, a count control circuit 601 may include a delay circuit 611, an OR logic gate 621, an inverter 631 and an AND logic gate 641. The count control circuit 601 may be included in the controller 500 and/or the frequency detector 400 in FIG. 2. FIG. 9 is a non-limiting example embodiment and the configuration of the count control circuit 601 may be implemented variously.

The delay circuit 611 may generate a first signal 51 by delaying an RF enable signal RFEN that is activated during the turn-on period TON and deactivated during the turn-off period TOFF.

The OR logic gate 621 may generate a second signal S2 by performing an OR logic operation on the RF enable signal RFEN and the first signal 51.

The inverter 631 may generate a third signal S3 by inverting the second signal S2.

The AND logic gate 641 may generate a count enable signal CEN by performing an AND logic operation on a measurement enable signal MEN and the third signal S3, where the measurement enable signal MEN is activated during the plurality of measurement periods T1~TN.

As a result, the count enable signal CEN may be activated at a time point after a delay time td from a start time point of the turn-off period TOFF, and may be deactivated at a start time point of the turn-on period TON.

Figure 11:
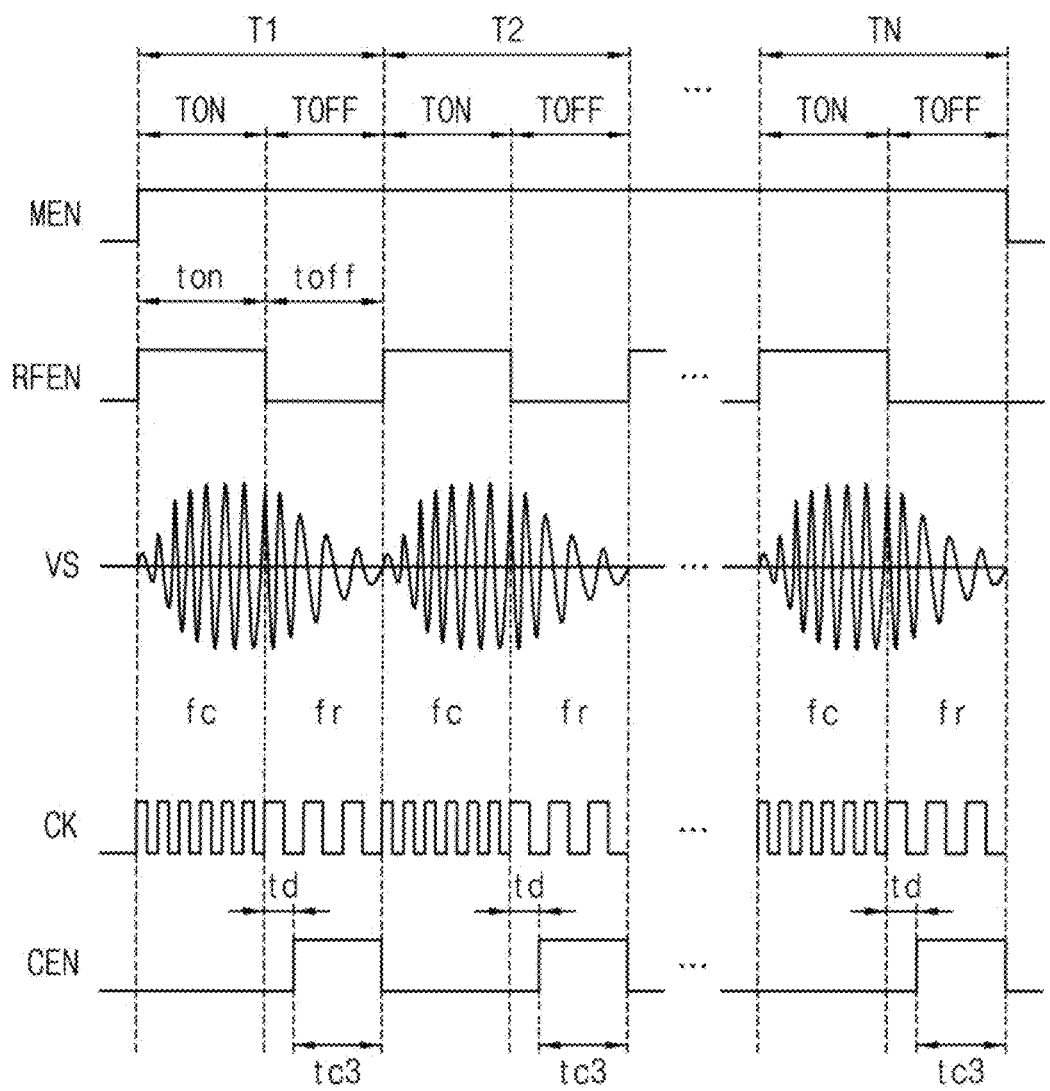
FIG. 11 is a timing diagram illustrating a method of detecting a resonance frequency of an NFC device according to some example embodiments.

With reference to FIG. 11, a method of detecting a resonance frequency of an NFC device using the count enable signal CEN of FIGS. 9 and 10 may be described.

FIG. 11 is a timing diagram illustrating a method of detecting a resonance frequency of an NFC device according to some example embodiments.

Referring to FIG. 11, a measurement enable signal MEN may be activated during a plurality of measurement periods T1~TN. For example, the measurement enable signal MEN may be activated in a logic high level.

Each of the plurality of measurement periods T1~TN may include a turn-on period TON and a turn-off period TOFF. The RF enable signal RFEN may be activated during the turn-on period TON and deactivated during the turn-off period TOFF. The turn-on period TON may be longer than, shorter than, or the same amount of time as the turn-off period TOFF.

Based on the RF enable signal RFEN, the transmitter 300 may be enabled to output an RF signal to the resonator 100 during the turn-on period TON and disabled during the turn-off period TOFF, thereby generating the sensing voltage signal VS at the resonator 100.

The clock extractor 410 in FIG. 4 may generate a clock signal CK toggling according to oscillation of the sensing voltage signal VS. The clock signal CK may oscillate with a transmission frequency fc during the turn-on period TON and oscillate with the resonance frequency fr during the turn-off period TOFF.

The counter 420 in FIG. 4 may generate the clock count CNT by counting the clock number during an activation time interval of the count enable signal CEN. In some example embodiments, the count enable signal CEN may be activated at a time point after a delay time td from a start time point of the turn-off period TOFF and deactivated at a start time point of the turn-on period TON. In this case, the time interval of counting the clock number corresponds to N*tc3, where N indicate the number of the plurality of measurement periods T1~TN and tc3 indicates the activation time interval of the count enable signal CEN.

The resonance frequency fr may be determined by calculating the resonance frequency fr based on an activation time interval of the count enable signal CEN, a number of the plurality of measurement periods T1~TN, and the measured clock count CNT. The calculation is substantially the same as described with reference to Equation 3 and Equation 4, except that the time interval toff of the turn-off period TOFF in Equation 3 and Equation 4 should be replaced by the activation time interval tc3 of the count enable signal CEN.

Even though the RF signal from the transmitter is blocked, the oscillation frequency of the sensing voltage signal VS may be slightly different from the resonance frequency fr during a transition period corresponding to the initial portion of the turn-off period TOFF. By delaying the start of activation of the count enable signal CEN by the delay time td, the clocks during the transition period may be excluded from the measurement of the clock count CNT, and thus a more accurate resonance frequency fr may be detected.

Figure 13:
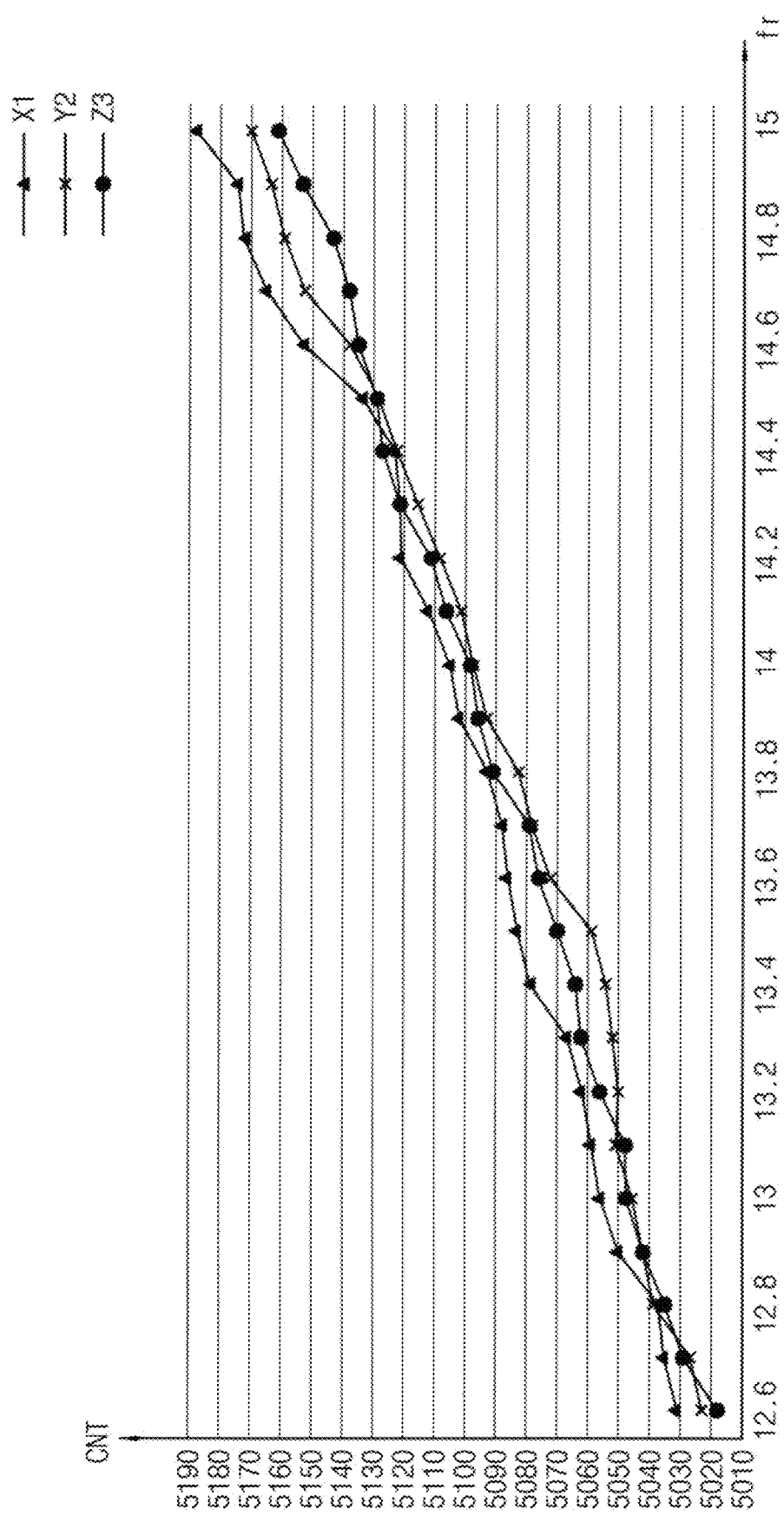

FIGS. 12 and 13 are diagrams illustrating example embodiments of a mapping table for detection of a resonance frequency of an NFC device according to some example embodiments.

FIGS. 12 and 13 illustrate an example of a mapping table MTAB indicating mapping relation between a plurality of values of the clock count CNT and a plurality of values of the resonance frequency fr, three antenna characteristics X1, Y2 and Z3. The mapping table MTAB may be obtained by measuring the resonance frequency fr using an external device, and measuring the clock count CNT according to some example embodiments.

A real NFC device such as NFC device 10 may have a fixed one antenna characteristic, and only the mapping relation corresponding to the fixed one antenna characteristic may be included in the mapping table. The measurement values in FIGS. 12 and 13 may be fitted to a linear function and/or a non-linear function and the more detailed mapping table may be obtained.

The above-described frequency generator 430 may store the mapping table MTAB and may determine the resonance frequency fr corresponding the measured clock count CNT based on the mapping table MTAB.

The resonance frequency fr obtained according to some example embodiments may be provided to an external device, and may be used to determine failure of the NFC device. For example, the normal range of the resonance frequency fr may be set to be 13 MHz-14 MHz when the NFC device uses a frequency of 13.56 MHz. If the measured resonance frequency fr is out of a normal range, the NFC device may be determined as a failed device.

Figure 14:
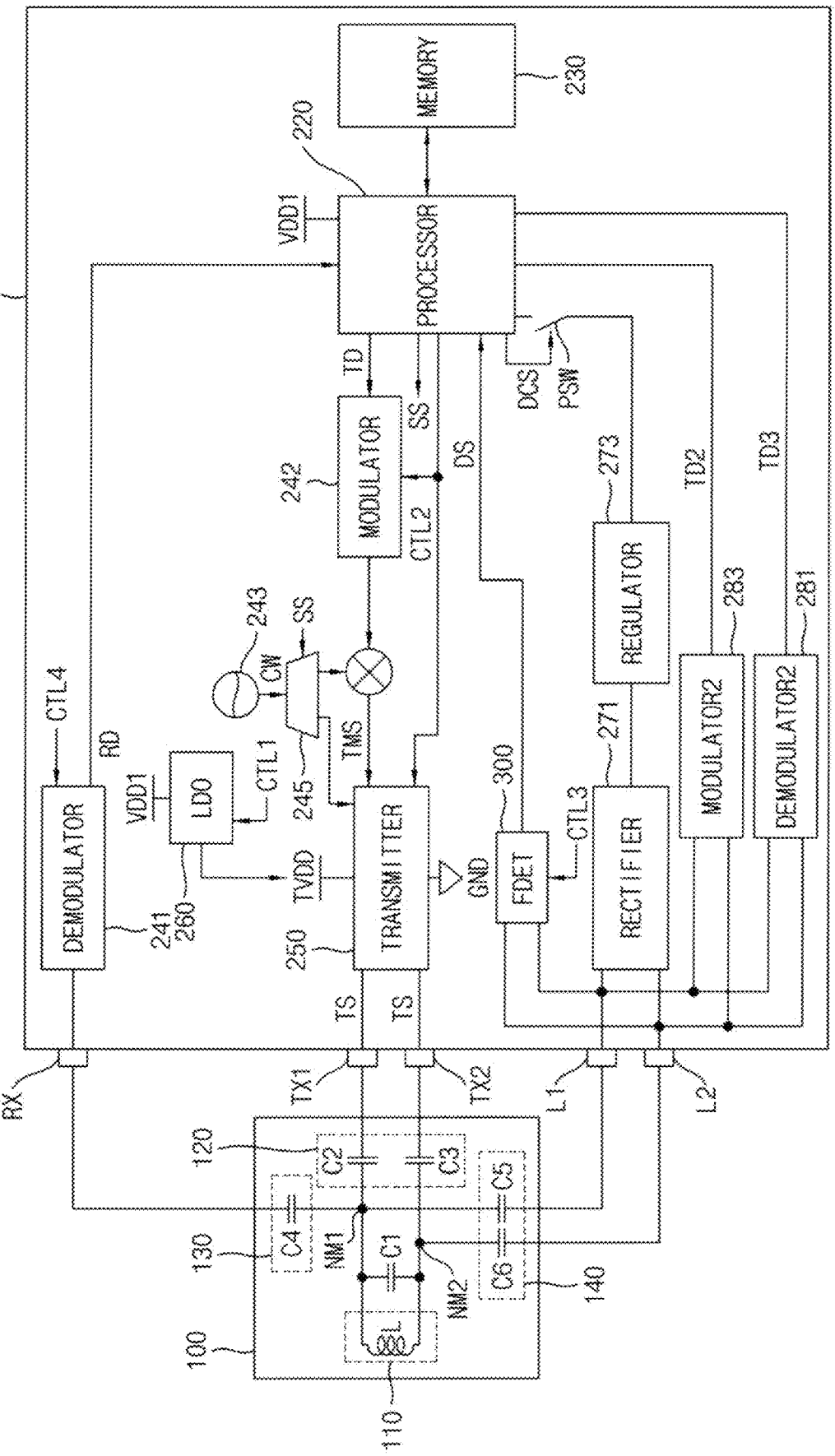
FIG. 14 is a diagram illustrating an NFC device according to some example embodiments.

FIG. 14 is a diagram illustrating an NFC device according to some example embodiments. Elements used to operate an NFC device 10a in the reader mode as well as elements used to operate the NFC device 10a in the card mode are illustrated in FIG. 14.

Referring to FIG. 14, the NFC device 10a includes a resonator 100 and an NFC chip 200a.

The NFC chip 200a is coupled to the resonator 100 through a first power terminal L1, a second power terminal L2, a first transmission terminal TX1, a second transmission terminal TX2, and a reception terminal RX. The resonator 100 includes a resonance circuit 110 including an antenna L and a first capacitor C1, and a matching circuit 120 coupled to the resonance circuit 110, the first transmission terminal TX1 and the second transmission terminal TX2, and including a second capacitor C2 and a third capacitor C3 to perform an impedance matching. The resonator 100 further includes a first filter 130 coupled to the resonance circuit 110 and the reception terminal RX, the first filter 130 including a fourth capacitor C4, and a second filter 140 coupled to the resonance circuit 110, the first power terminal L1, and the second power terminal L2, the second filter including a fifth capacitor C5 and a sixth capacitor C6. The configuration of the resonator 100 illustrated in FIG. 14 is an example only, and the configuration of the resonator 100 according to some example embodiments may not be limited to the above, but may be variously modified.

The NFC chip 200a may perform the signal transmission operation and the signal reception operation through the first power terminal L1 and the second power terminal L2 in the card mode, perform the signal transmission operation through the first transmission terminal TX1 and the second transmission terminal TX2 in the reader mode, and perform the signal reception operation through the reception terminal RX in the reader mode.

The NFC chip 200a includes a processor 220, a memory 230, a first demodulator 241, a first modulator 242, an oscillator 243, a mixer 244, a demultiplexer 245, a transmitter 250, a regulator 260, a frequency detector 400, a rectifier 271, a regulator 273, a power switch PSW, a second demodulator 281, and a second modulator 283.

The processor 220 may control the overall operation of the NFC chip 200a. The processor 220 may operate by receiving the first power supply voltage VDD1 from a power source, such as a battery.

When the signal reception operation is performed in the active mode (e.g., concurrently with the NFC device 10a operating in the active mode), the demodulator 241 generates reception data RD by demodulating the signal supplied from the resonator 100 through the reception terminal RX to provide the reception data RD to the processor 220. The processor 220 may store the reception data RD in the memory 230.

When the signal transmission operation is performed in the active mode, the processor 220 reads out transmission data TD from the memory 230 to provide the transmission data TD to the modulator 242, and the modulator 242 modulates the transmission data TD to provide a modulation signal. In addition, the oscillator 243 generates a carrier signal CW having a frequency corresponding to a carrier frequency (for example, 13.56 MHz), the demultiplexer 245 may provide the carrier signal CW to the mixer 244 in response to a selection signal SS, and the mixer 244 may combine the carrier signal CW with the modulated signal to generate a transmission modulation signal TMS.

In each of a preset (or, alternatively, variable) phase and a detection phase of the standby mode, the demultiplexer 245 may provide the carrier signal CW to the transmitter 250 in response to the selection signal SS from the processor 220, and the transmitter 250 may generate a transmission signal TS based on the carrier signal CW to perform a detection operation for detecting an NFC tag.

The transmitter 250 is coupled between a transmission power supply voltage TVDD and a ground voltage GND. The transmitter 250 may receive the carrier signal CW from the demultiplexer in the standby mode and generate the transmission signal TS corresponding to the carrier signal CW. In addition, the transmitter 250 may receive the transmission modulation signal TMS from the mixer 244 in the active mode, and the resonator 100 may generate the electromagnetic wave EMW corresponding to the transmission signal TS provided from the transmitter 250 through the first and second transmission terminals TX1 and TX2. For example, the transmitter 250 may allow the first and second transmit terminals TX1 and TX2 to be coupled to either the transmission power supply voltage TVDD through a pull-up load (e.g. a PMOS load) or the ground voltage GND through a pull-down load (e.g. an NMOS load) based on the transmission modulation signal TMS in the active mode, so that the transmission signal TS may be provided to the resonator 102a through the first and second transmit terminals TX1 and TX2.

The processor 220 may provide the transmitter 250 with a control signal CTL2 having a plurality of bits indicating a mode and operation of the NFC device 10a based on the mode and the operation of the NFC device 10a. Alternately or additionally, the processor 220 may control operation of the demodulator 241 by providing a control signal CTL4 to the demodulator 241.

The regulator 260 is coupled to the first power supply voltage VDD1 and may provide the transmission power supply voltage TVDD to the transmitter 250. The regulator 260 may be implemented with a low drop-out (LDO) regulator and may adjust a level of the transmission power supply voltage TVDD in response to a control signal CTL1 from the processor 220.

In the active mode, the processor 220 provides a control signal CTL2 to enable the modulator 242 and transmits a request command through the transmitter 250. The processor 220 provides the control signal CTL4 to enable the demodulator 241, and the demodulator 241 may await a response in response to the request command from the NFC tag during a predetermined (or, alternatively, a variable) time interval. When the response is received in response to the request command during the predetermined time interval, the NFC device 10a initiates data transmission/reception with the NFC tag. When the response is not received in response to the request command during the predetermined time interval, the processor 220 provides the control signals CTL2 and CTL4 to disable the modulator 242 and the demodulator 241, respectively, and provides the control signals CTL1 and CTL3 to the regulator 260 and the frequency detector 400, respectively, to perform the above-described frequency detection operation.

When the signal reception operation is performed in the card mode, the second demodulator 281 generates a second reception data RD2 by demodulating the signal supplied from the resonator 100 through the first and second power terminals L1 and L2 to provide the second reception data RD2 to the processor 220. The processor 220 may decode the second reception data RD2 and may store some or all of the second reception data RD2 in the memory 230.

When the signal transmission operation is performed in the card mode, the processor 220 may read out the output data from the memory 230 and may encode the output data to provide a second transmission data TD2 to the second modulator 283, and the second modulator 283 modulates the second transmission data TD2 to provide a modulation signal to the first and second power terminals L1 and L2.

As described above, in a measurement mode for detecting the resonance frequency, the transmitter 300 may generate a sensing voltage signal VS at the resonator 100. With respect to, or during, a plurality of measurement periods where each measurement period includes a turn-on period and a turn-off period, the transmitter 300 may be enabled to output an RF signal to the resonator 100 during the turn-on period and may be disabled during the turn-off period, to generate the sensing voltage signal VS. For example, the sensing voltage signal VS may correspond to a voltage across the capacitor C1 that is, the voltage between measurement nodes NM1 and NM2.

The frequency detector 400 may be coupled to the resonator 100 through first and second power terminals L1 and L2. As described above, the frequency detector 400 may detect the resonance frequency fr of the resonator 100 based on the sensing voltage signal VS.

Figure 15:
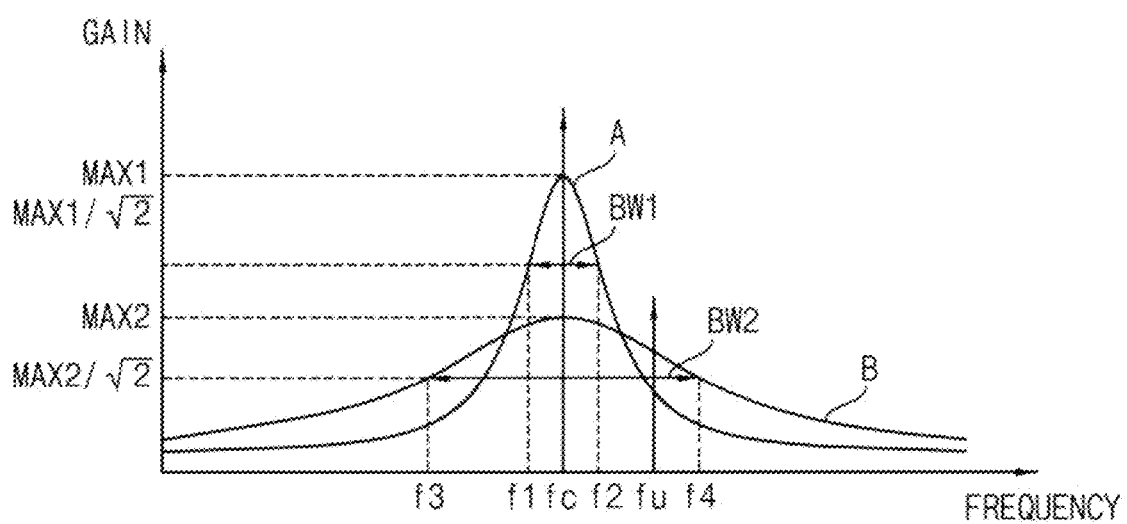
FIG. 15 is a diagram for describing frequency characteristics of a resonator included in an NFC device.

FIG. 15 is a diagram for describing frequency characteristics of a resonator included in an NFC device. In FIG. 15, a first graph A represents the frequency characteristic of the resonator 100.

Referring to FIGS. 2 and 15, the resonator 100 may have the longitudinal frequency characteristic having the center on the carrier frequency fc. The resonator 100 may have the maximum gain MAX1 at the carrier frequency fc, and may have a first bandwidth BW1 where a first frequency f1 and a second frequency f2 serve as cutoff frequencies. The Q factor of the resonator 100 may have a value obtained by dividing the carrier frequency fc by the first bandwidth BW1.

Since the NFC chip 200 maintains the Q factor of the resonator 100 in the reader mode, and when the signal transmit operation is performed in the card mode, the resonator 100 may have the frequency characteristic as shown in the first graph A in the reader mode and when the signal transmit operation is performed in the card mode.

If the frequency characteristic of the resonator 100 is not changed when the signal receive operation is performed in the card mode, as shown in FIG. 15, a high-speed signal having the high frequency fu equal to or higher than the second frequency f2 (for instance, the high frequency of 848 Kbps or more) is filtered by the resonator 100, so the NFC chip 200 may not normally demodulate the input data provided from the external device. Thus, the NFC device 10 may not perform the high-speed communication.

The bandwidth BW1 of the resonator 100 may be reduced as the size of the antenna included in the resonator 100 becomes reduced, and the intensity of the EMW received from the external device becomes weak, so the available communication speed of the NFC device 10 may be further limited.

As will be described below, the NFC chip 200 included in the NFC device 10 can reduce the Q factor of the resonator 100 when the signal receive operation is performed in the card mode. For instance, the NFC chip 200 reduces the gain of the resonator 100 by connecting the terminal connected to the resonator 100 to the ground voltage GND through the pull-down load when the signal receive operation is performed in the card mode, so the resonator 100 may have the frequency characteristic as shown in a second graph B of FIG. 15. At this time, the resonator 100 may have the maximum gain MAX2 at the carrier frequency fc and may have a second bandwidth BW2 where a third frequency f3 and a fourth frequency f4 serve as cutoff frequencies. Since the Q factor of the resonator 100 may have a value obtained by dividing the carrier frequency fc by the second bandwidth BW2, the Q factor of the resonator 100 is reduced.

In this case, even when the resonator 100 receives the high-speed signal having the high frequency fu equal to or higher than the second frequency f2 (for instance, the high frequency of 848 Kbps or more), the high-speed signal can be normally received without being filtered. Thus, the available communication speed of the NFC device 10 may be increased.

Meanwhile, since the load modulation characteristic is lowered as the gain of the resonator 100 is reduced in the signal transmit operation, as described above, the NFC chip 200 cuts off the terminal connected to the resonator 100 from the ground voltage GND when the signal transmit operation is performed, so that the Q factor of the resonator 100 can be maintained.

Figure 16:
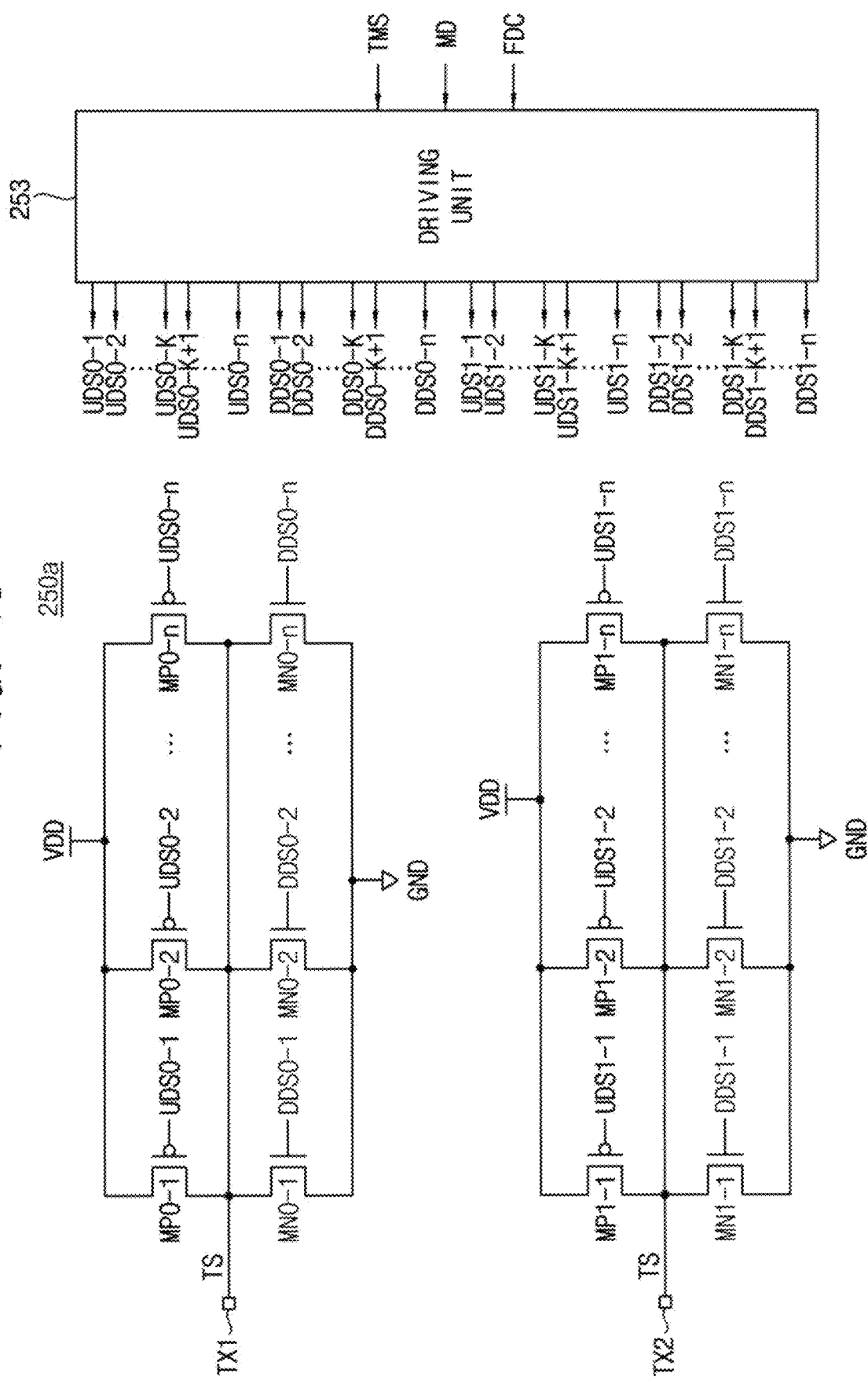
FIG. 16 is a diagram illustrating an example embodiment of transmitter included in an NFC device according to some example embodiments.
Figure 17:
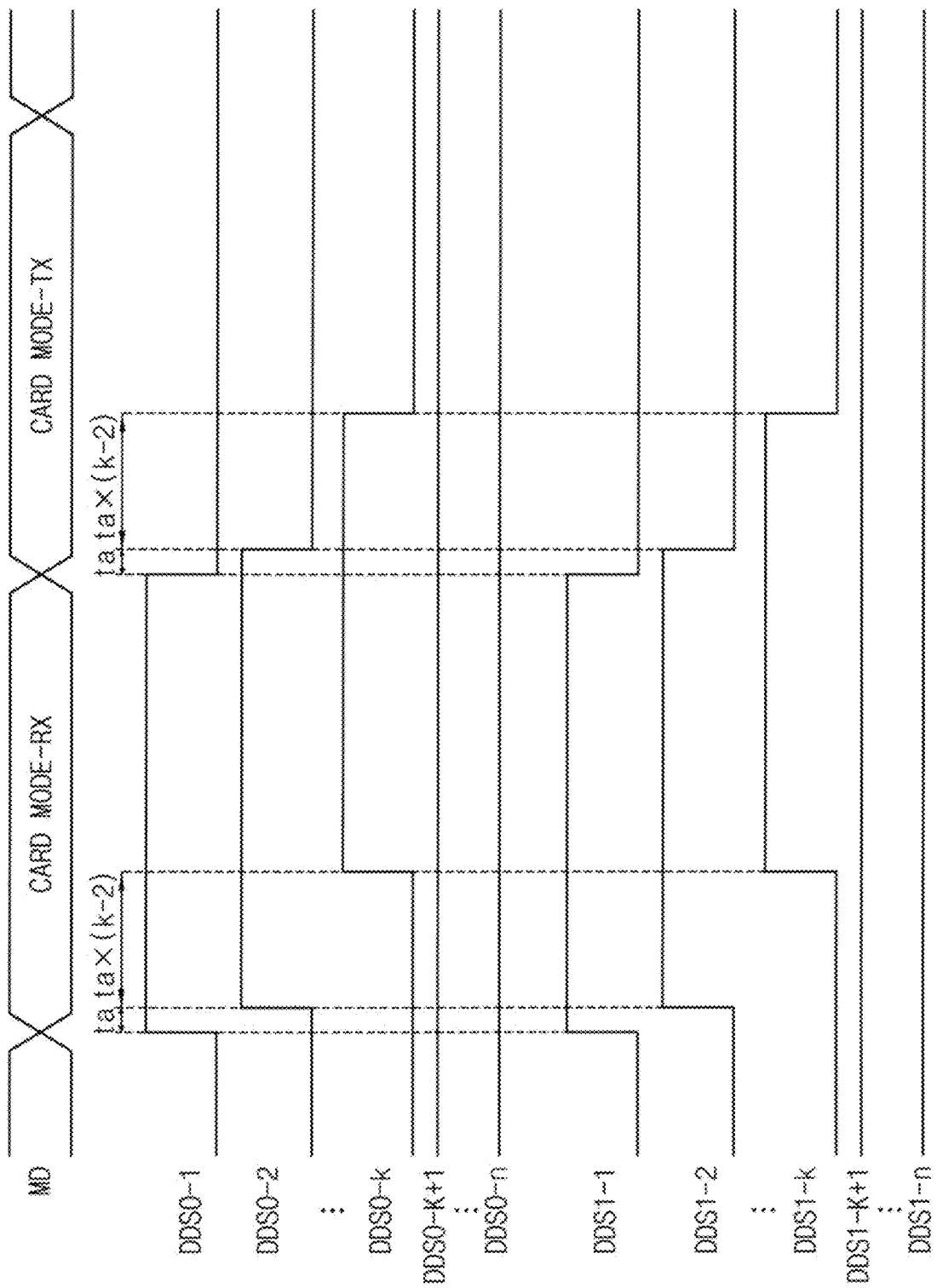
FIG. 17 is a diagram for describing an operation of the transmitter of FIG. 16.

FIG. 16 is a diagram illustrating an example embodiment of transmitter included in an NFC device according to some example embodiments, and FIG. 17 is a diagram for describing an operation of the transmitter of FIG. 16.

Referring to FIG. 16, the transmitter 250a may include (1-1)th to (1-n)th pull-up transistors (e.g. PMOS transistors) MP0-1, MP0-2, . . . , and MP0-n, second-1 to second-n pull-up transistors (e.g. PMOS transistors) MP1-1, MP1-2, . . . , and MP1-n, (1-1)th to (1-n)th pull-down transistors (e.g. NMOS transistors) MN0-1, MN0-2, . . . , and MN0-n, second-1 to second-n pull-down transistors (e.g. NMOS transistors) MN1-1, MN1-2, . . . , and MN1-n, and a driving unit 253.

The (1-1)th to (1-n)th pull-up transistors MP0-1, MP0-2, . . . , and MP0-n and the second-1 to second-n pull-up transistors MP1-1, MP1-2, . . . , and MP1-n may be PMOS transistors, and the (1-1)th to (1-n))th pull-down transistors MN0-1, MN0-2, . . . , and MN0-n and the second-1 to second-n pull-down transistors MN1-1, MN1-2, . . . , and MN1-n may be the NMOS transistors; however, example embodiments are not limited thereto.

The (1-1)th to (1-n)th pull-up transistors MP0-1, MP0-2, . . . , and MP0-n may be connected in parallel between the supply voltage VDD and the first transmit terminal TX1, and the (1-1)th to (1-n)th pull-down transistors MN0-1, MN0-2, . . . , and MN0-n may be connected in parallel between the first transmit terminal TX1 and the ground voltage GND.

The second-n pull-up transistors MP1-1, MP1-2, . . . , and MP1-n may be connected in parallel between the supply voltage VDD and the second transmit terminal TX2 and the second-1 to second-n pull-down transistors MN1-1, MN1-2, . . . , and MN1-n may be connected in parallel between the second transmit terminal TX2 and the ground voltage GND.

The driving unit 253 may drive the (1-1)th to (1-n)th pull-up transistors MP0-1, MP0-2, . . . , and MP0-n through (1-1)th to (1-n))th pull-up driving signals UDS0-1, UDS0-2, . . . , and UDS0-n, respectively, drive the (1-1)th to (1-n)th pull-down transistors MN0-1, MN0-2, . . . , and MN0-n through (1-1)th to (1-n)th pull-down driving signals DDS0-1, DDS0-2, . . . , and DDS0-n, respectively, drive the second-n pull-up transistors MP1-1, MP1-2, . . . , and MP1-n through second-1 to second-n pull-up driving signals UDS1-1, UDS1-2, . . . , and UDS1-n, respectively, and drive the second-1 to second-n pull-down transistors MN1-1, MN1-2, . . . , and MN1-n through second-1 to second-n pull-down driving signals DDS1-1, DDS1-2, . . . , and DDS1-n, respectively.

The driving unit 253 may determine whether the NFC chip 200d is in the card mode or the reader mode and may determine the signal receive operation or the signal transmit operation when the mode is the card mode based on the mode signal MD supplied from the CPU 240.

In the reader mode, the driving unit 253 may turn on the (1-1)th to (1-n)th pull-up transistors MP0-1, MP0-2, . . . , and MP0-n or the (1-1)th to (1-n))th pull-down transistors MN0-1, MN0-2, . . . , and MN0-n and may turn on the second-n pull-up transistors MP1-1, MP1-2, . . . , and MP1-n or the second-1 to second-n pull-down transistors MN1-1, MN1-2, . . . , and MN1-n based on the transmit modulation signal TMS.

The driving unit 253 may receive a full-down control signal FDC that is generate based on the detection result of the resonance frequency fr by the processor 220 in FIG. 14.

In the card mode, the driving unit 253 may select k pull-down transistors from among the (1-1)th to (1-n)th pull-down transistors MN0-1, MN0-2, . . . , and MN0-n and the second-1 to second-n pull-down transistors MN1-1, MN1-2, . . . , and MN1-n based on full-down control signal FDC. For instance, the driving unit 253 may select the (1-1)th to (1-k)th pull-down transistors MN0-1, MN0-2, . . . , and MN0-k and the second-1 to second-k pull-down transistors MN1-1, MN1-2, . . . , and MN1-k, wherein k is a positive integer equal to or less than n.

In the card mode, the driving unit 253 generates the (1-1)th to (1-n)th pull-up driving signals UDS0-1, UDS0-2, . . . , and UDS0-n and the second-1 to second-n pull-up driving signals UDS1-1, UDS1-2, . . . , and UDS1-n having the logic high level, so the driving unit 253 can turn off the (1-1)th to (1-n)th pull-up transistors MP0-1, MP0-2, . . . , and MP0-n and the second-1 to second-n pull-up transistors MP1-1, MP1-2, . . . , and MP1-n. In addition, as shown in FIG. 17, the driving unit 253 generates the (1-(k+1))th to (1-n)th pull-down driving signals DDS0-(k+1), . . . , and DDS0-n and the second-(k+1) to second-n pull-down driving signals DDS1-(k+1), . . . , and DDS1-n having the logic low level, so the driving unit 253 can turn off the (1-(k+1))th to (1-n)th pull-down transistors MN0-(k+1), . . . , and MN0-n and the second-(k+1) to second-n pull-down transistors MN1-(k+1), . . . , and MN1-n, which are not selected.

In addition, as shown in FIG. 17, the driving unit 253 may sequentially turn on the (1-1)th to (1-k)th pull-down transistors MN0-1, MN0-2, . . . , and MN0-k and the second-1 to second-k pull-down transistors MN1-1, MN1-2, . . . , and MN1-k at the first time interval Td by sequentially enabling the (1-1)th to (1-k)th pull-down driving signals DDS0-1, DDS0-2, . . . , and DDS0-k and the second-1 to second-k pull-down driving signals DDS1-1, DDS1-2, . . . , and DDS1-k at the first time interval Td when the signal receive operation RX is performed in the card mode.

Further, as shown in FIG. 17, the driving unit 253 may sequentially turn off the (1-1)th to (1-k)th pull-down transistors MN0-1, MN0-2, . . . , and MN0-k and the second-1 to second-k pull-down transistors MN1-1, MN1-2, . . . , and MN1-k at the first time interval Td by sequentially disabling the (1-1)th to (1-k)th pull-down driving signals DDS0-1, DDS0-2, . . . , and DDS0-k and the second-1 to second-k pull-down driving signals DDS1-1, DDS1-2, . . . , and DDS1-k at the first time interval Td when the signal transmit operation TX is performed in the card mode.

As described above, the transmitter 250a drives the (1-1)th to (1-n)th pull-up transistors MP0-1, MP0-2, . . . , and MP0-n, the second-n pull-up transistors MP1-1, MP1-2, . . . , and MP1-n, the (1-1)th to (1-n)th pull-down transistors MN0-1, MN0-2, . . . , and MN0-n and the second-1 to second-n pull-down transistors MN1-1, MN1-2, . . . , and MN1-n based on the transmit modulation signal TMS in the reader mode to perform the normal operation to provide the transmit signal TS to the resonator 100. In addition, when the signal receive operation is performed in the card mode, the transmitter 250a connects the first transmit terminal TX1 and the second transmit terminal TX2 to the ground voltage GND through the (1-1)th to (1-k)th pull-down transistors MN0-1, MN0-2, . . . , and MN0-k and the second-1 to second-k pull-down transistors MN1-1, MN1-2, . . . , and MN1-k, respectively, thereby reducing the Q factor of the resonator 100. In addition, the transmitter 250a may control the reduction degree of the Q factor of the resonator 100 by adjusting the number (k) of pull-down transistors to be turned on when the signal receive operation is performed in the card mode based on full-down control signal FDC.

When the transmitter 250a concurrently turns on or off the (1-1)th to (1-k)th pull-down transistors MN0-1, MN0-2, . . . , and MN0-k and the second-1 to second-k pull-down transistors MN1-1, MN1-2, . . . , and MN1-k in the card mode, the magnitude of the voltage in the first power terminal L1 and the second power terminal L2 may sway in a moment so that the error may occur during the data communication unless otherwise addressed.

As described above, the transmitter 250a sequentially turns on the (1-1)th to (1-k)th pull-down transistors MN0-1, MN0-2, . . . , and MN0-k and the second-1 to second-k pull-down transistors MN1-1, MN1-2, . . . , and MN1-k at the first time interval Td when the signal receive operation is performed in the card mode, and sequentially turns off the (1-1)th to (1-k)th pull-down transistors MN0-1, MN0-2, . . . , and MN0-k and the second-1 to second-k pull-down transistors MN1-1, MN1-2, . . . , and MN1-k at the first time interval Td when the signal transmit operation is performed in the card mode, thereby preventing the sway of the voltage in the first power terminal L1 and the second power terminal L2 when changing the Q factor of the resonator 100.

As such, by setting the proper pull-down amount corresponding to the detected resonance frequency fr, the load modulation amplitude (LMA) may be increased and the performance of the NFC device may be enhanced.

Figure 18:
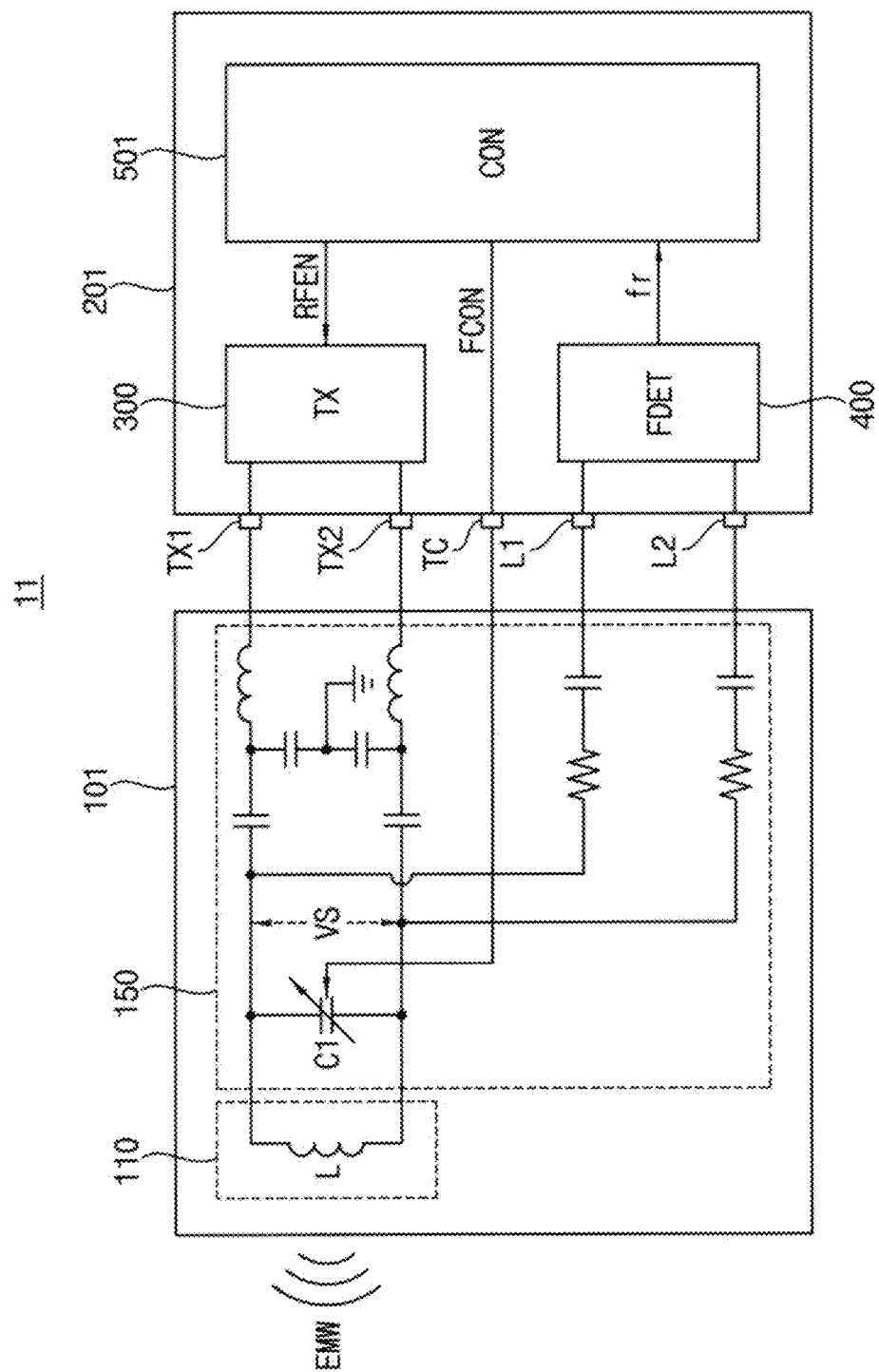
FIG. 18 is a diagram illustrating an NFC device according to some example embodiments.

FIG. 18 is a diagram illustrating an NFC device according to some example embodiments.

Referring to FIG. 18, an NFC device 11 includes a resonator 101 and an NFC chip 201. The NFC chip 201 includes a transmitter TX 300, a frequency detector FDET 400 and a controller CON 501. The NFC device 11 of FIG. 18 is substantially the same as the NFC device 10 of FIG. 2 and repeated descriptions are omitted.

The controller 501 may generate a frequency control signal FCON based on the resonance frequency fr detected as described above. The resonator 101 may have a configuration capable of varying impedance of the resonator 10. For example, as illustrated in FIG. 18, a capacitor C1 may be implemented as a variable capacitor. The frequency control signal FCON may be provided to the resonator 101 through a control terminal TC. The resonance frequency fr may be adjusted to be adapted to various operation environments by adjusting the capacitance of the capacitor C1 based on the frequency control signal FCON.

Figure 19:
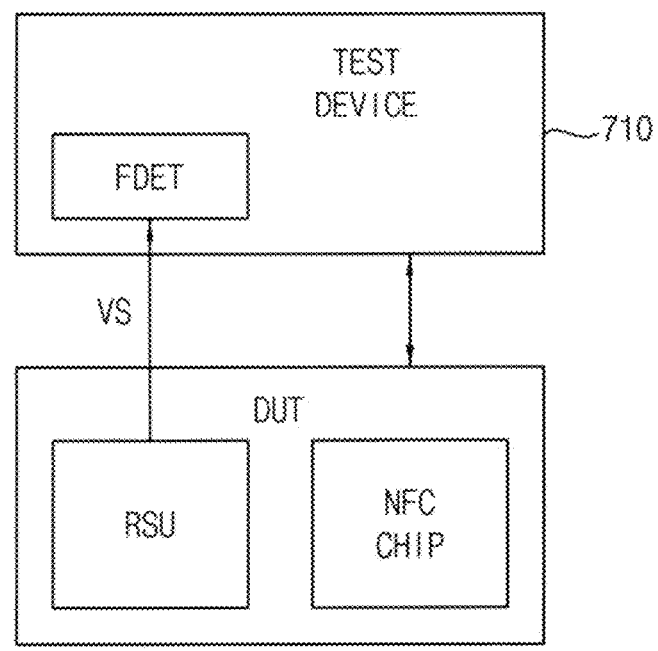
FIGS. 19 and 20 are diagrams illustrating a test system according to some example embodiments.
Figure 20:
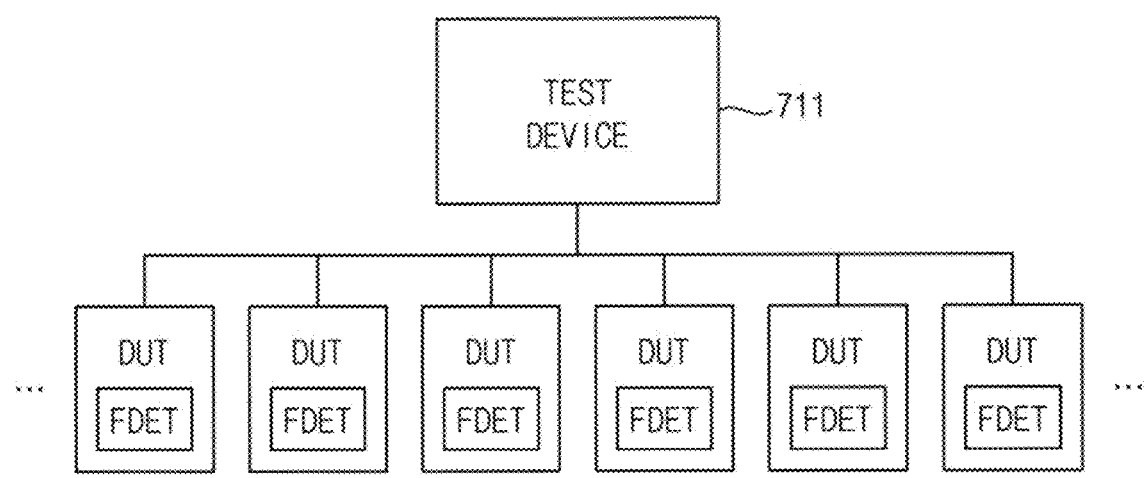

FIGS. 19 and 20 are diagrams illustrating a test system according to some example embodiments.

Referring to FIG. 19, a test system 700 may include a test device 710 and a device under test (DUT). The DUT may be or may include a NFC device including a resonator RSU and an NFC chip.

FIG. 19 illustrates some example embodiments wherein the above described frequency detector FDET is included in the test device. In this case, the sensing voltage signal VS may be provided to the test device 710 external to the DUT (that is, the NFC device) and the resonance frequency fr may be detected based on the sensing voltage signal VS using the frequency detector FDET that is included in the test device 710.

FIG. 20 illustrates some example embodiments wherein the frequency detector FDET is included in the DUT (e.g., the NFC device). In this case, the control signals for detecting the resonance frequency fr may be provided simultaneously to multiple DUTs and a parallel test may be performed efficiently.

Figure 21:
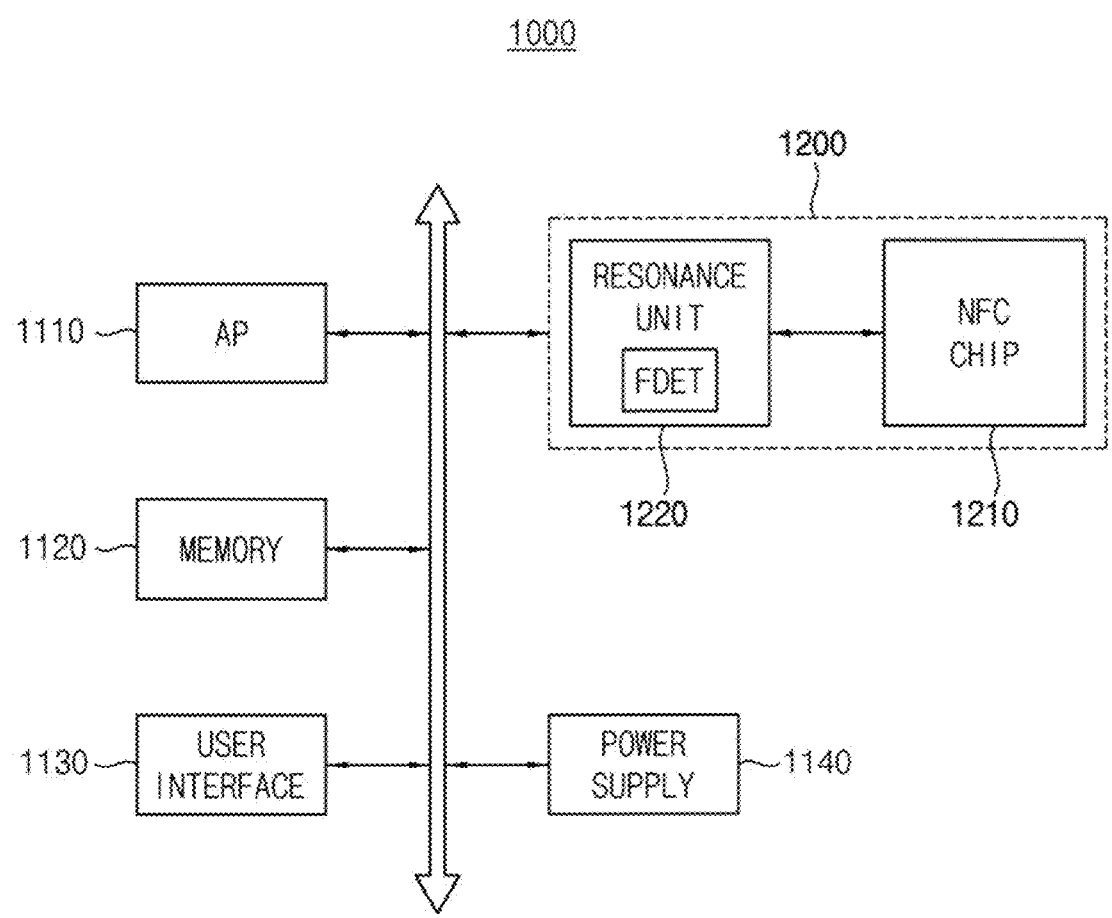
FIG. 21 is a block diagram illustrating an electronic device according to some example embodiments.

FIG. 21 is a block diagram illustrating an electronic device according to some example embodiments.

Referring to FIG. 21, an electronic device 1000 includes an application processor (AP) 1110, an NFC device 1200, a memory device 1120, a user interface 1130, and a power supply 1140.

The application processor 1110 may control overall operations of the electronic device 1000. The memory device 1120 may store data for an operation of the electronic device 1000. The NFC device 1200 may provide the output data stored in the memory device 1120 to the external device through NFC and store the input data received from the external device through NFC into the memory device 1120.

The NFC device 1200 includes a resonator 1210 and an NFC chip 1220. As described above, the NFC device 1200 may efficiently detect a resonance frequency using a frequency detector FDET.

The user interface 1130 may include at least one input device, such as a keypad and/or a touch screen, and at least one output device, such as a speaker and/or a display device. The power supply 1140 may supply a power supply voltage to the electronic device 1000.

As described above, the NFC device and/or the method according to some example embodiments may accurately, or more accurately, detect the resonance frequency by measuring the resonance frequency during the plurality of measurement periods. The resonance frequency may be detected more accurately by converting the sensing voltage signal to the clock signal and counting the clock number of the clock signal.

The NFC device and/or the method according to some example embodiments may efficiently detect the resonance frequency by generating the sensing voltage signal using the transmitter established in the NFC device.

The NFC device and/or the method according to some example embodiments may efficiently detect the resonance frequency without an external apparatus by implementing the frequency detector as an on-chip component.

Each of, or at least some of, the elements described above may include processing circuitry such as hardware including logic circuits; a hardware/software combination such as a processor executing software; or a combination thereof. For example, the controller 500, the transmitter 300, the frequency detector 400, the clock extractor 410, the counter 420, the frequency generator 430, the driving unit 253, the processor 220, the memory 230, the first demodulator 241, the first modulator 242, the oscillator 243, the mixer 244, the demultiplexer 245, the transmitter 250, the regulator 260, the rectifier 271, the regulator 273, the power switch PSW, the second demodulator 281, the second modulator 283, etc. may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Inventive concepts may be applied to an NFC device and/or a system including the NFC device. For example, inventive concepts may be applied to systems such as at least one of a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those of ordinary skill in the art will readily appreciate that many modifications are possible in the example embodiments without materially departing from inventive concepts.

What is claimed is:

1. A near field communication (NFC) device comprising:
   a resonator including an antenna and a matching circuit;
   a transmitter configured to generate a sensing voltage signal at the resonator during a plurality of measurement periods, each of the plurality of measurement periods including a plurality of turn-on periods each lasting for a turn-on time correspond to an interval of the respective turn-on period, and each of the plurality of measurement periods including, a plurality of turn-off periods each last for a turn-off time corresponding to a second interval of the respective turn-off period, the transmitter being enabled to output a radio frequency (RF) signal to the resonator during the turn-on period and being disabled from outputting an RF signal to the resonator during the turn-off period; and
   a frequency detector configured to detect a resonance frequency of the resonator based on the sensing voltage signal and on an equation, wherein the equation indicates that the resonance frequency is proportional to the turn-on time with a first proportionality constant, and the equation indicates that the resonance frequency is inversely proportional to a square of the turn-off time with a second proportionality constant.

2. The NFC device of claim 1, wherein the transmitter is configured to generate the sensing voltage signal to oscillate with a transmission frequency during the turn-on period based on the RF signal and to oscillate with the resonance frequency during the turn-off period based on an induced electromotive force that is induced in the resonator by the RF signal.

3. The NFC device of claim 1, wherein the frequency detector is configured to convert the sensing voltage signal to a clock signal and to count a clock number of the clock signal.

4. The NFC device of claim 1, wherein the transmitter is configured to generate the sensing voltage signal at the resonator based on an RF enable signal, the RF enable signal activated during the turn-on period and deactivated during the turn-off period.

5. The NFC device of claim 1, wherein the frequency detector comprises:
a clock extractor configured to generate a clock signal that toggles according to an oscillation of the sensing voltage signal;
a counter configured to generate a clock count by counting a clock number of the clock signal; and
a frequency generator configured to provide the resonance frequency based on the clock count.

6. The NFC device of claim 5, further comprising:
count control circuitry configured to generate a count enable signal,
wherein the counter is configured to generate the clock count by counting the clock number of the clock signal during an activation time interval of the count enable signal.

7. The NFC device of claim 6, wherein the count control circuitry is configured to generate the count enable signal that is activated during the plurality of measurement periods independent of the turn-on period and the turn-off period.

8. The NFC device of claim 7, wherein the frequency detector is configured to determine the resonance frequency based on the equation, the equation being $$fr=(CNT*ton)/(N*toff^2)$$

where fr corresponds to the resonance frequency, CNT corresponds to the clock count and is the first proportionality constant, N corresponds to a number of the plurality of measurement periods and is the second proportionality constant, ton corresponds to a time interval of each turn-on period and toff corresponds to a time interval of each turn-off period.

9. The NFC device of claim 6, wherein the count control circuit is configured to generate the count enable signal, the count enable signal activated during the turn-off period and deactivated during the turn-off period.

10. The NFC device of claim 9, wherein the frequency detector is configured to determine the resonance frequency based on the equation, the equation being $$fr=CNT*ton/(N*toff^2)$$

where fr corresponds to the resonance frequency, CNT corresponds to the clock count and is the first proportionality constant, N corresponds to a number of the plurality of measurement periods and is the second proportionality constant, ton corresponds to the time interval of each turn-on period, and toff corresponds to the time interval of each turn-off period.

11. The NFC device of claim 6, wherein the count control circuit comprises:
an inverter configured to generate an inversion RF enable signal by inverting the RF enable signal that is activated during the turn-on period and deactivated during the turn-off period; and
an AND logic gate configured to generate the count enable signal by performing an AND logic operation on a measurement enable signal and the inversion RF enable signal, where the measurement enable signal is active during the plurality of measurement periods.

12. The NFC device of claim 6, wherein the count control circuitry is configured to generate the count enable signal to be activated at a time point after a delay time from a start time point of the turn-off period and deactivated at a start time point of the turn-on period.

13. The NFC device of claim 6, wherein the count control circuitry comprises:
delay circuitry configured to generate a first signal by delaying an RF enable signal that is activated during the turn-on period and deactivated during the turn-off period;
an OR logic gate configured to generate a second signal by performing an OR logic operation on the RF enable signal and the first signal;
an inverter configured to generate a third signal by inverting the second signal; and
an AND logic gate configured to generate the count enable signal by performing an AND logic operation on a measurement enable signal and the third signal, where the measurement enable signal is active during the plurality of measurement periods.

14. The NFC device of claim 6, wherein the frequency detector is configured to determine the resonance frequency based on a mapping table indicating mapping between a plurality of values of the clock count and a plurality of values of the resonance frequency.

15. A method of detecting a resonance frequency of a near field communication (NFC) device, the method comprising:
during a plurality of measurement periods where each of the plurality of measurement periods includes a plurality of turn-on periods each lasting for a first time interval corresponding to a turn-on time, and a plurality of turn-off periods each lasting for a second time interval corresponding to a turn-off time, generating a sensing voltage signal at a resonator included in an NFC device by enabling a transmitter included in the NFC device to output a radio frequency (RF) signal to the resonator during the turn-on period and by disabling the transmitter during the turn-off period; and
detecting a resonance frequency of the resonator based on the sensing voltage signal and on an equation, wherein
the equation indicates that the resonance frequency is proportional to the turn-on time with a first proportionality constant, and
the equation indicates that the resonance frequency is inversely proportional to a square of the turn-off time with a second proportionality constant.

16. The method of claim 15, wherein the generating resonance frequency comprises:
generating a clock signal toggling according to oscillation of the sensing voltage signal;
generating a clock count by counting a clock number of the clock signal; and providing the resonance frequency based on the clock count.

17. The method of claim 15, wherein the NFC device detects the resonance frequency based on the sensing voltage signal using a frequency detector that is included in the NFC device.

18. The method of claim 15, wherein the NFC device provides the sensing voltage signal to an external device and the external device detects the resonance frequency based on the sensing voltage signal using a frequency detector that is included in the external device.

19. The method of claim 15, wherein the sensing voltage signal oscillates with a transmission frequency during the turn-on period based on the RF signal, and oscillates with the resonance frequency during the turn-off period based on an electromotive force induced in the resonator by the RF signal.

20. A method of detecting a resonance frequency of a near field communication (NFC) device, the method comprising:
during a plurality of measurement periods where each measurement period includes a turn-on period lasting for an interval, a time of the interval being a turn-on time and a turn-off period lasting for another interval, a time of the other interval being a turn-off time, generating an RF enable signal that is activated during the turn-on period and deactivated during the turn-off period;
generating a sensing voltage signal based on the RF enable signal, the sensing voltage generated at a resonator included in an NFC device by enabling a transmitter included in the NFC device to output a radio frequency (RF) signal to the resonator during the turn-on period and by disabling the transmitter during the turn-off period;
generating a clock signal that toggles according to oscillation of the sensing voltage signal;
generating a clock count by counting a clock number of the clock signal during an activation time interval of a count enable signal; and
providing the resonance frequency based on the clock count and on an equation, wherein
the equation indicates that the resonance frequency is proportional to the turn-on time with a first proportionality constant corresponding to the clock count, and
the equation indicates that the resonance frequency is inversely proportional to a square of the turn-off time with a second proportionality constant.

* * * * *